(12) United States Patent
Matsunaga

(10) Patent No.: US 11,869,554 B2
(45) Date of Patent: Jan. 9, 2024

(54) MAGNETIC DISK DEVICE AND SERVO PATTERN WRITE METHOD

(71) Applicants: Kabushiki Kaisha Toshiba, Tokyo (JP); Toshiba Electronic Devices & Storage Corporation, Tokyo (JP)

(72) Inventor: Toshitaka Matsunaga, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/888,224

(22) Filed: Aug. 15, 2022

(65) Prior Publication Data

US 2023/0290374 A1 Sep. 14, 2023

(30) Foreign Application Priority Data

Mar. 9, 2022 (JP) ................................ 2022-036125

(51) Int. Cl.
*G11B 5/596* (2006.01)

(52) U.S. Cl.
CPC ...... *G11B 5/59661* (2013.01); *G11B 5/59666* (2013.01)

(58) Field of Classification Search
None
See application file for complete search history.

(56) References Cited

U.S. PATENT DOCUMENTS

| 6,987,636 | B1 | 1/2006 | Chue et al. |
| 7,068,459 | B1* | 6/2006 | Cloke ................ G11B 5/59661 360/75 |
| 7,248,426 | B1* | 7/2007 | Weerasooriya .... G11B 5/59666 |
| 7,375,918 | B1 | 5/2008 | Shepard et al. |
| 7,804,659 | B2* | 9/2010 | Matsunaga ........ G11B 5/59638 360/75 |
| 8,498,072 | B2 | 7/2013 | Annampedu et al. |
| 8,780,488 | B2 | 7/2014 | Takahoshi et al. |
| 9,076,490 | B1* | 7/2015 | Nie ...................... G11B 5/5543 |
| 9,472,223 | B1* | 10/2016 | Mendonsa ......... G11B 20/1816 |

* cited by examiner

*Primary Examiner* — K. Wong
(74) *Attorney, Agent, or Firm* — Allen & Overy LLP

(57) ABSTRACT

According to one embodiment, a magnetic disk device comprises a disk, a head that writes data to the disk and reads data from the disk, and a controller that controls a position of the head so as to write a first spiral servo pattern to the disk, and overwrite a second spiral servo pattern different from the first spiral servo pattern by shifting in a radial direction of the disk from the first spiral servo pattern.

20 Claims, 17 Drawing Sheets

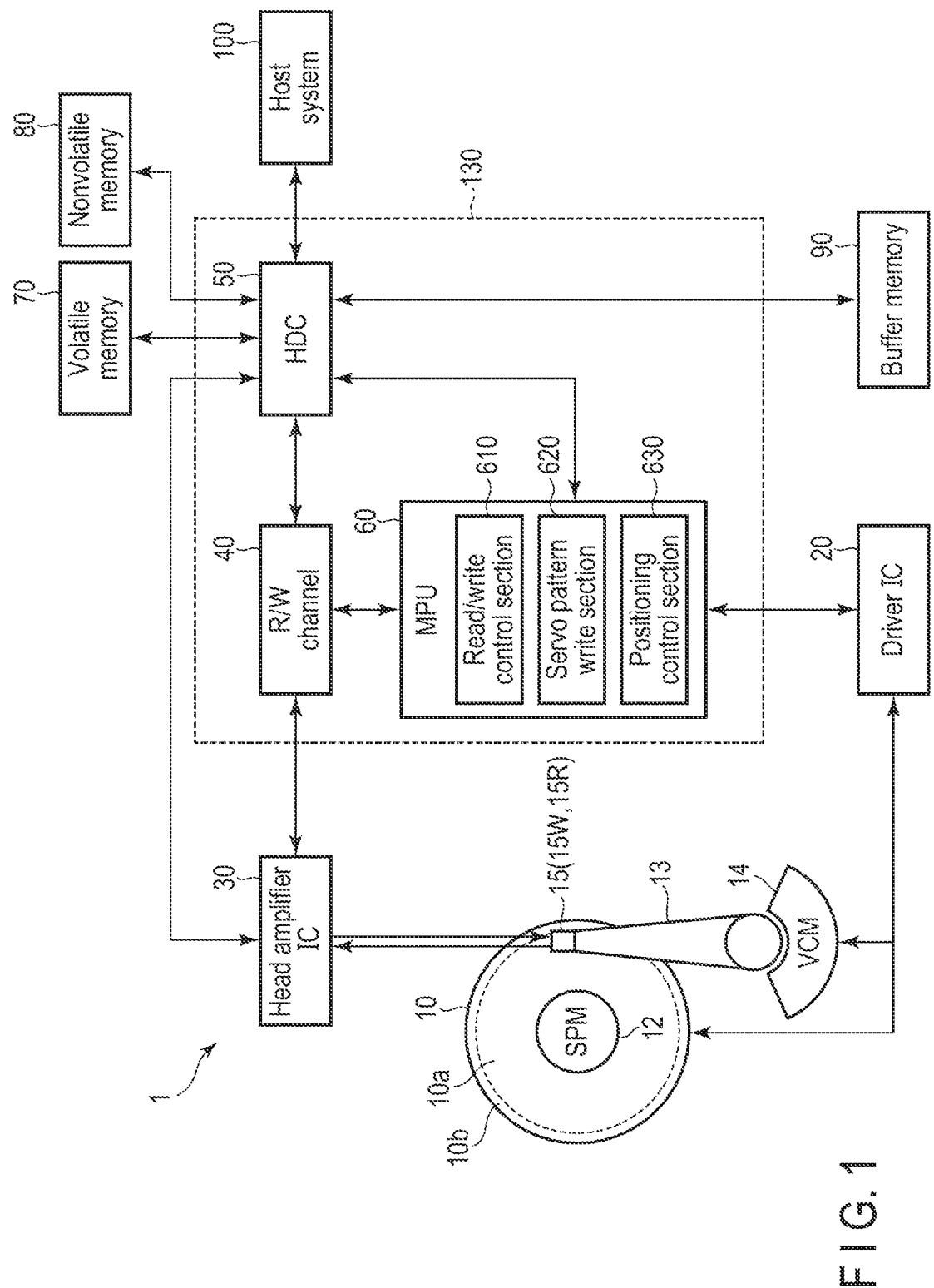
F I G. 1

| Overwriting number | Offset amount | Number of times of repetition |
|---|---|---|
| 1 | 0 | 1 |
| 2 | -0.5 track | 1 |
| 3 | -1.0 track | 1 |

TB1

F I G. 7

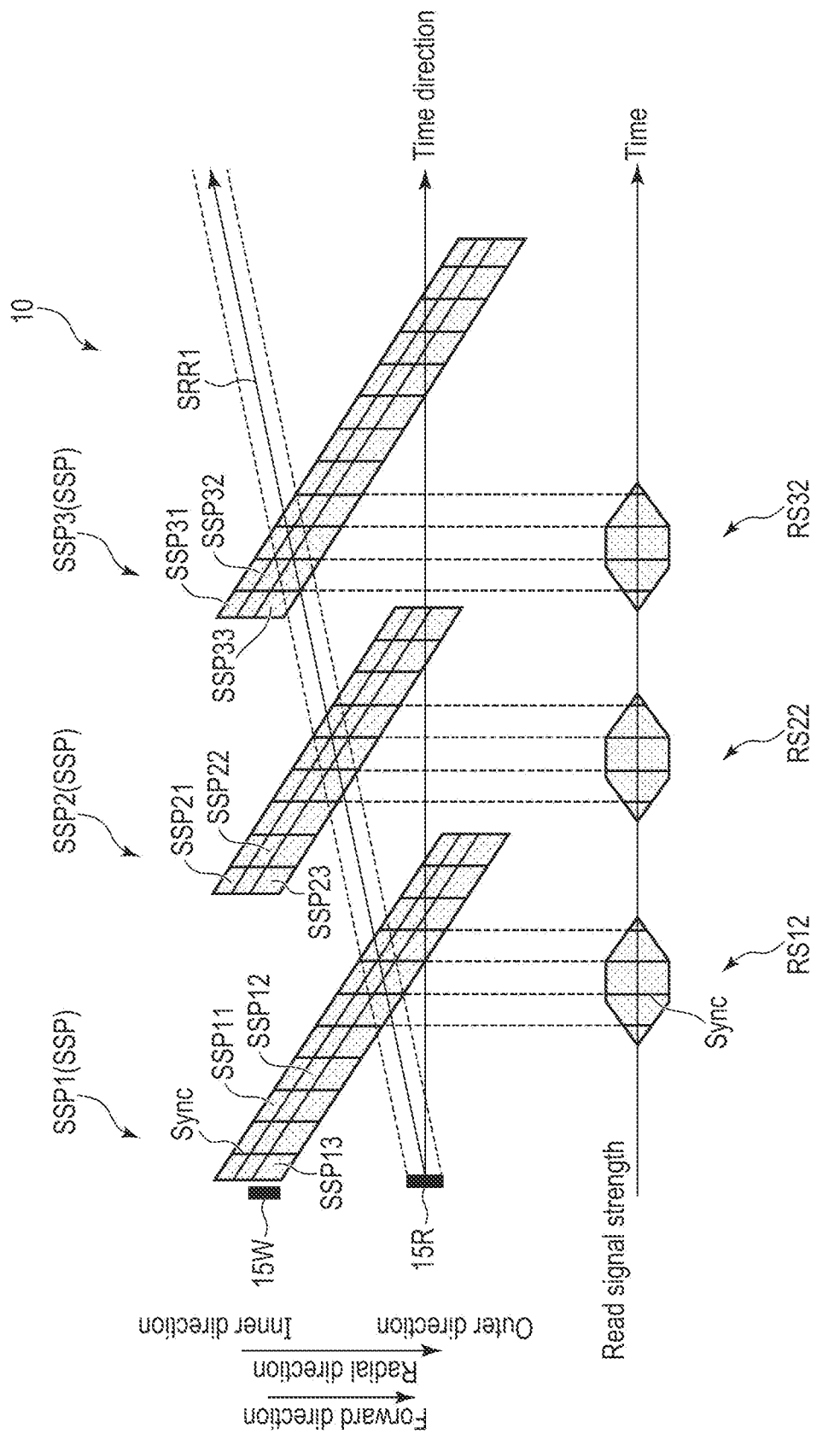
F I G. 9

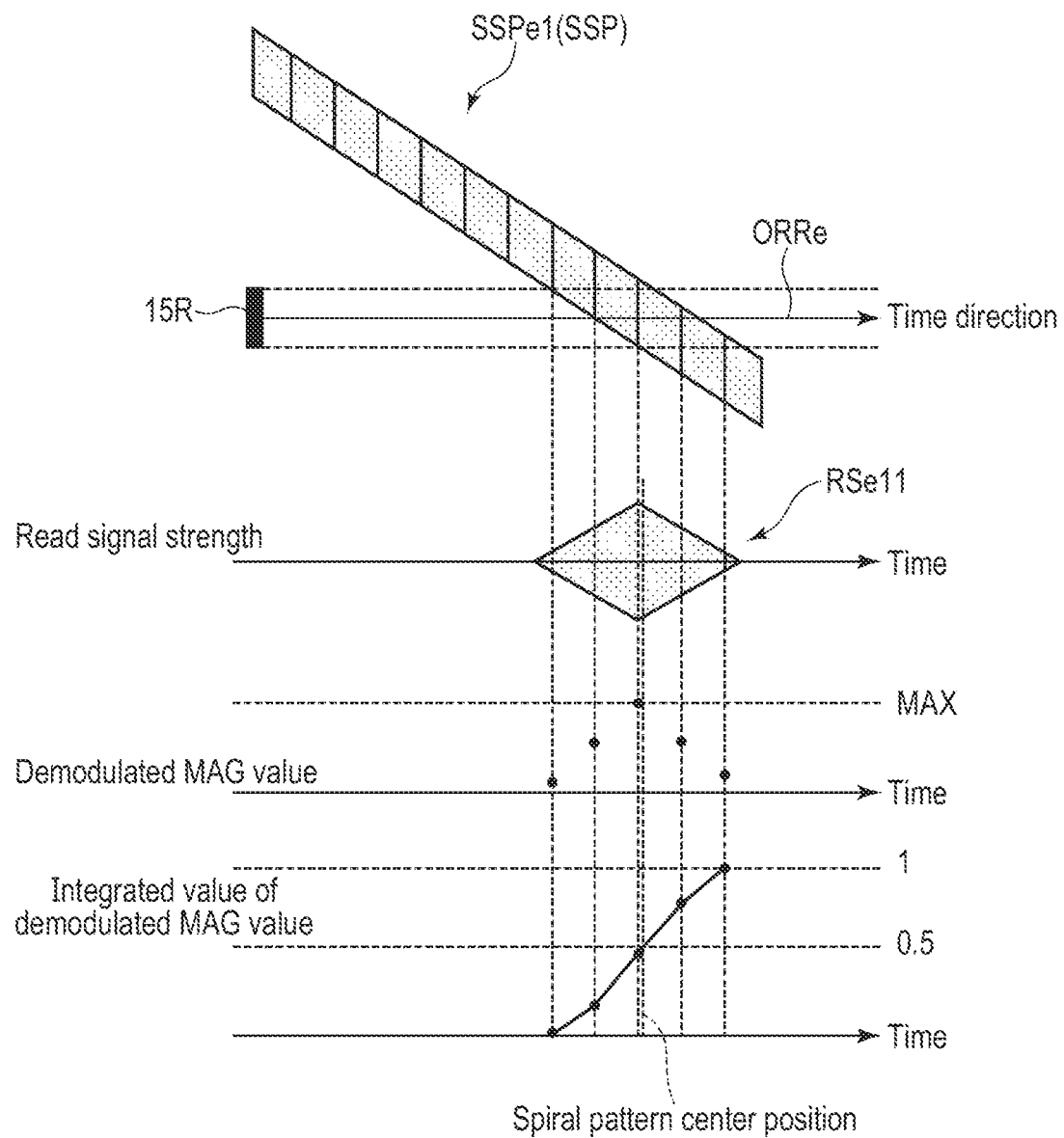
F I G. 10

| Overwriting number | Offset amount | Number of times of repetition |
|---|---|---|
| 1 | +1.5 track | 1~5 |
| 2 | +1.0 track | 1~5 |
| 3 | +0.5 track | 1~5 |
| 4 | 0 | 1~5 |
| 5 | -0.5 track | 1~5 |
| 6 | -1.0 track | 1~5 |
| 7 (erase) | +0.5~0 track | 1 |

TB2

F I G. 15

MAGNETIC DISK DEVICE AND SERVO PATTERN WRITE METHOD

CROSS-REFERENCE TO RELATED APPLICATIONS

This application is based upon and claims the benefit of priority from Japanese Patent Application No. 2022-036125, filed Mar. 9, 2022, the entire contents of which are incorporated herein by reference.

FIELD

Embodiments described herein relate generally to a magnetic disk device and a servo pattern write method.

BACKGROUND

The magnetic disk device writes a plurality of spiral servo patterns by a head onto a disk on which data and patterns are not written at all in a process of blank disk writing (BDW) of writing the spiral servo patterns. In a process of self-servo write (SSW), the magnetic disk device writes a plurality of servo patterns (hereinafter, sometimes referred to as product servo pattern) used in a final product by the head based on a plurality of spiral servo patterns.

In the magnetic disk device, when the write width of the head is narrow, the width of the spiral servo pattern becomes narrow, and thus the number of detected sync marks included in a read signal of the spiral servo pattern becomes small. In the magnetic disk device, since the number of sync marks detected by reading the spiral servo pattern by the head during seek is smaller than the number of sync marks detected by reading the spiral servo pattern by the head during on-track, there is a possibility that the sync mark cannot be detected during seek and the servo comes off. Therefore, there is a possibility that reliability of the process of SSW is reduced.

BRIEF DESCRIPTION OF THE DRAWINGS

FIG. 1 is a block diagram illustrating a configuration of a magnetic disk device according to a first embodiment.

FIG. 7 is a schematic view illustrating an example of a table of an offset amount of the overwritten spiral servo pattern according to the present embodiment.

FIG. 9 is a schematic view illustrating an example of the write processing method of the overwritten spiral servo pattern according to the present embodiment.

FIG. 10 is a schematic view illustrating an example of a calculation method of a spiral pattern center position of the normal spiral servo pattern.

FIG. 15 is a schematic view illustrating an example of a table of an offset amount of an overwritten erase spiral pattern according to a second embodiment.

DETAILED DESCRIPTION

Figure 2:
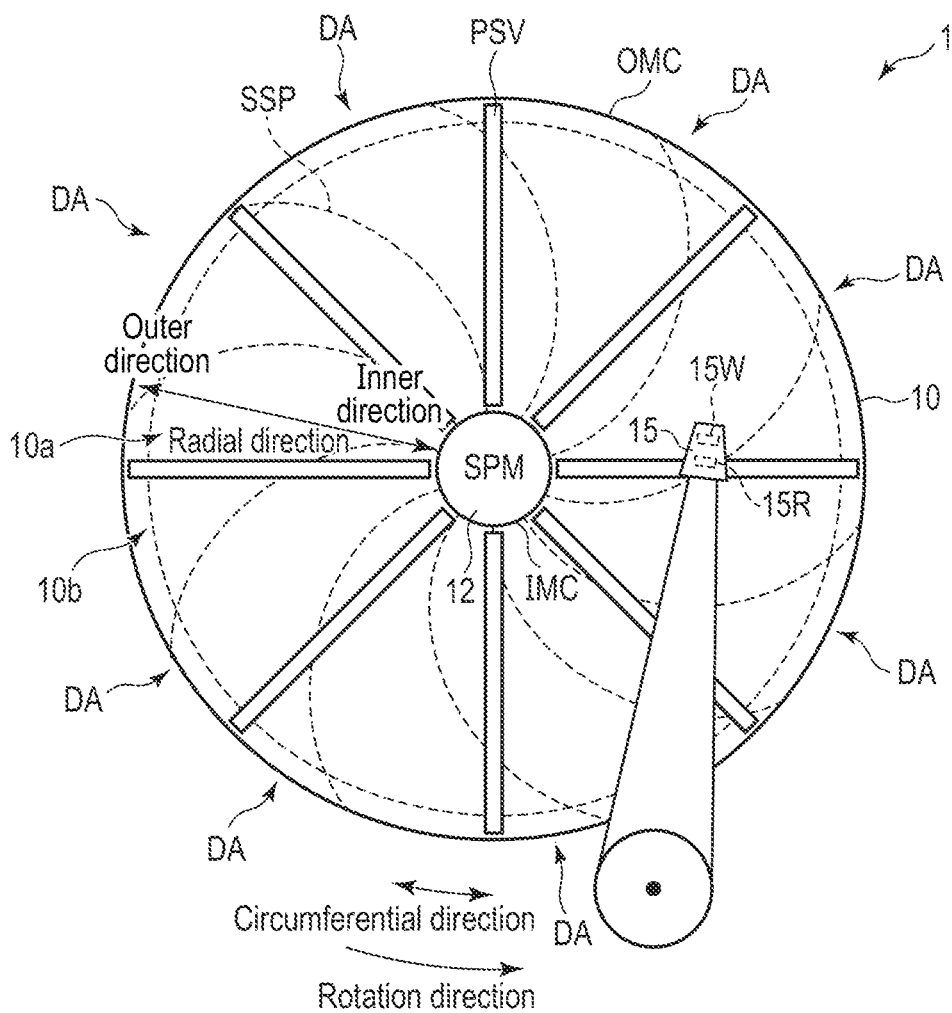
FIG. 2 is a schematic view illustrating an example of arrangement of a head with respect to a disk according to the first embodiment.

Embodiments will be described hereinafter with reference to the accompanying drawings.

In general, according to one embodiment, a magnetic disk device comprises a disk, a head that writes data to the disk and reads data from the disk, and a controller that controls a position of the head so as to write a first spiral servo pattern to the disk, and overwrite a second spiral servo pattern different from the first spiral servo pattern by shifting in a radial direction of the disk from the first spiral servo pattern.

Embodiments will be described below with reference to the drawings. The drawings are merely examples, and do not limit the scope of the invention.

First Embodiment

FIG. 1 is a block diagram illustrating the configuration of a magnetic disk device 1 according to the first embodiment.

The magnetic disk device 1 includes a head disk assembly (HDA) described later, a driver IC 20, a head amplifier integrated circuit (hereinafter, head amplifier IC or preamplifier) 30, a volatile memory 70, a nonvolatile memory 80, a buffer memory (buffer) 90, and a system controller 130 that is a one-chip integrated circuit. The magnetic disk device 1 is connected to a host system (hereinafter, simply referred to as host) 100.

The HDA includes a magnetic disk (hereinafter, referred to as disk) 10, a spindle motor (hereinafter, referred to as SPM) 12, an arm 13 on which the head 15 is mounted, and a voice coil motor (hereinafter, referred to as VCM) 14. The disk 10 is attached to the SPM 12 and rotates by drive of the SPM 12. The arm 13 and the VCM 14 constitute an actuator. By drive of the VCM 14, the actuator controls movement of the head 15 mounted on the arm 13 to a predetermined position of the disk 10. Two or more of the disks 10 and the heads 15 may be provided. Two or more actuators may also be provided.

In the disk 10, a user data region 10a available from a user and a system area 10b in which information necessary for system management is written are allocated to a region in which the data can be written. Note that as a region different from the user data region 10a and the system area 10b, a media cache (or sometimes referred to as media cache region) that temporarily stores or records data (or a command) transferred from the host 100 or the like before being written to a predetermined region of the user data region 10a may be allocated to the disk 10. Hereinafter, a direction from the inner circumference toward the outer circumference of the disk 10 or a direction from the outer circumference toward the inner circumference of the disk 10 is referred to as a radial direction. In the radial direction, a direction from the inner circumference toward the outer circumference is referred to as an outer direction (or outside), and a direction from the outer circumference toward the inner circumference is referred to as an inner direction (or inside). A direction intersecting, for example, orthogonal to the radial direction of the disk 10 is referred to as a circumferential direction. The circumferential direction corresponds to a direction along the circumference of the disk 10. A predetermined position of the disk 10 in the radial direction is sometimes referred to as radial position, and a predetermined position of the disk 10 in the circumferential direction is sometimes referred to as circumferential position. The radial position and the circumferential position are sometimes collectively referred to simply as a position. The disk 10 is divided into a plurality of regions (hereinafter, referred to as a zone or a zone region) for each predetermined range in the radial direction. The zone includes a plurality of tracks. The track includes a plurality of sectors. Note that the "track" is used in various meanings such as a "region among a plurality of regions into which the disk 10 is divided for each predetermined range in the radial direction", "data written in a region among a plurality of regions into which the disk 10 is divided for each predetermined range in the radial direction", a "region extending in the circumferential direction at a predetermined radial position of the disk 10", "data written in a region extending in the circumferential direction at a predetermined radial position of the disk 10", a "region for a circle of a predetermined radial position of the disk 10", "data for a circle written in a region for a circle of a predetermined radial position of the disk 10", a "path of the head 15 positioned and written at a predetermined radial position of the disk 10", "data written by the head 15 positioned at a predetermined radial position of the disk 10", and "data written in a predetermined track of the disk 10". The "sector" is used in various meanings such as a "region among a plurality of regions into which a predetermined track of the disk 10 is divided in the circumferential direction", "data written in a region among a plurality of regions into which a predetermined track of the disk 10 is divided in the circumferential direction", a "region of a predetermined circumferential position at a predetermined radial position of the disk 10", "data written in a region of a predetermined circumferential position at a predetermined radial position of the disk 10", and "data written in a predetermined sector of the disk 10". The "radial width of the track" is sometimes referred to as "track width". The center position of the track width is sometimes referred to as track center. The track center is sometimes simply referred to as track.

The head 15 includes a write head 15W and a read head 15R mounted on a slider as a main body. The write head 15W writes data on the disk 10. For example, the write head 15W writes a predetermined track onto the disk 10. The read head 15R reads data recorded on the disk 10. For example, the read head 15R reads a predetermined track of the disk 10. Note that the "write head 15W" is sometimes simply referred to as the "head 15", and the "read head 15R" is sometimes simply referred to as the "head 15". The "write head 15W and read head 15R" are sometimes collectively referred to as the "head 15". The "center part of the head 15" is sometimes referred to as the "head 15", the "center part of the write head 15W" is sometimes referred to as the "write head 15W", and the "center part of the read head 15R" is sometimes referred to as the "read head 15R". The "center part of the write head 15W" is sometimes referred to as the "head 15", and the "center part of the read head 15R" is sometimes referred to as the "head 15". To "position center part of the head 15 at a predetermined position" is sometimes expressed as to "position the head 15 at a predetermined position", to "arrange the head 15 at a predetermined position", to "locate the head 15 in a predetermined position", or the like.

FIG. 2 is a schematic view illustrating an example of arrangement of the head 15 with respect to the disk 10 according to the present embodiment. FIG. 2 illustrates an innermost circumference IMC and an outermost circumference OMC of the disk 10. As illustrated in FIG. 2, in the circumferential direction, a direction in which the disk 10 rotates is referred to as a rotation direction. In the example illustrated in FIG. 2, the rotation direction is indicated in the anticlockwise direction, but may be in the opposite direction (clockwise direction).

In the example illustrated in FIG. 2, in the disk 10, the system area 10b is arranged in the outer direction of the user data region 10a. In other words, in the disk 10, the user data region 10a is arranged in the inner direction of the system area 10b. In the example illustrated in FIG. 2, the system area 10b is arranged on the outermost circumference OMC of the disk 10. Note that the user data region 10a may be divided and arranged in the radial direction of the disk 10. The system area 10b may be arranged at a position different from the position illustrated in FIG. 2. For example, the system area 10b may be arranged between the plurality of user data regions 10a on the disk 10, or may be arranged in the innermost circumference IMC of the disk 10.

The disk 10 has a data region DA, a plurality of servo patterns (hereinafter, sometimes referred to as product servo pattern) used in a final product or a plurality of servo regions (hereinafter, sometimes referred to as product servo region) PSV, and a plurality of spiral servo patterns (a plurality of course guide spiral (CGS) servo patterns, a plurality of fine guide spiral (FGS) servo patterns, and a plurality of final spiral (FS) servo patterns) SSP different from the plurality of product servo patterns PSV.

In FIG. 2, each of the plurality of data regions DA is arranged between the plurality of product servo patterns PSV. For example, the data region DA corresponds to a region between two consecutive product servo patterns PSV in the circumferential direction. Note that the "one data region DA in a predetermined track" is sometimes referred to as "data sector region". That is, the data region DA has at least one data sector region. Note that the "data region DA" is sometimes referred to as "data sector region DA". The data sector region includes at least one sector. The "data sector region" is sometimes referred to as "sector". "Data written in a data sector region" is sometimes referred to as "data sector region". "Data other than the product servo data written in the data sector region" is sometimes referred to as "user data".

In FIG. 2, the plurality of spiral servo patterns SSP extend spirally on the disk 10 for convenience. Although the plurality of spiral servo patterns SSP are described as extending in parallel on the disk 10, they need not actually extend in parallel. The plurality of spiral servo patterns SSP are discretely arranged at predetermined intervals in the circumferential direction of the disk 10. Hereinafter, the "spiral servo pattern SSP in a predetermined track" is sometimes referred to as "spiral servo sector". Note that the "spiral servo pattern SSP" is sometimes referred to as "spiral servo sector". The "spiral servo sector" is sometimes referred to as "spiral servo pattern". The "spiral servo sector" includes corresponding "servo data". Note that the "spiral servo data written in a spiral servo sector" is sometimes referred to as "spiral servo sector" or "spiral servo pattern". "Servo data" is sometimes referred to as "servo sector" or "servo pattern".

In FIG. 2, the plurality of product servo patterns PSV extend linearly in the radial direction for convenience. Although the plurality of product servo patterns PSV are described as linearly extending from the inside to the outside in the radial direction, they may be bent. For example, the product servo pattern PSV may extend spirally on the disk 10. The plurality of product servo patterns PSV radially extend in the radial direction of the disk 10 and are discretely arranged at predetermined intervals in the circumferential direction of the disk 10. Hereinafter, the "product servo pattern PSV in a predetermined track" is sometimes referred to as "product servo sector". Note that the "product servo pattern PSV" is sometimes referred to as "product servo sector". "Product servo sector" is sometimes referred to as "product servo pattern". The product servo sector includes servo data. Note that "product servo data written in a product servo sector" is sometimes referred to as "product servo sector".

The servo sector (or servo data) includes, for example, a preamble and a sync mark. In the servo sector, the preamble and the sync mark (or sync field data mark) are continuously arranged in this order from the front to the rear of the circumferential direction. The preamble includes preamble information for synchronization with a read signal of a servo pattern including the servo mark and the gray code. The sync mark includes information for detecting a head of a data sector region or the like. Note that the servo sector may include data other than the preamble and the sync mark. The sync mark may be included in the data sector region.

The driver IC 20 is connected to the system controller 130 (MPU 60 to be described later in detail), the SPM 12, and the VCM 14, and controls drive of the SPM 12 and the VCM 14 according to control of the system controller 130 (MPU 60 to be described later in detail).

The head amplifier IC (preamplifier) 30 includes a read amplifier and a write driver. The read amplifier amplifies a read signal read from the disk 10 and outputs it to the system controller 130 (read/write (R/W) channel 40 described later in detail). The write driver outputs, to the head 15, a write current corresponding to a signal output from the R/W channel 40. The head amplifier IC 30 is electrically connected to the head 15 and the like.

The volatile memory 70 is a semiconductor memory in which stored data is lost when power supply is cut off. The volatile memory 70 stores data and the like necessary for processing in each section of the magnetic disk device 1. The volatile memory 70 is, for example, a dynamic random access memory (DRAM) or a synchronous dynamic random access memory (SDRAM). Note that the volatile memory 70 may be included in the system controller 130 described later.

The nonvolatile memory 80 is a semiconductor memory that records stored data even when power supply is cut off. The nonvolatile memory 80 is, for example, a NOR type or NAND type flash read only memory (FROM). Note that the nonvolatile memory 80 may be included in the system controller 130 described later.

The buffer memory 90 is a semiconductor memory that temporarily records data and the like transmitted and received between the magnetic disk device 1 and the host 100. The buffer memory 90 may be configured integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like. The buffer memory 90 may be included in the system controller 130 described later.

The system controller (controller) 130 is achieved by using, for example, a large-scale integrated circuit (LSI) called a system-on-a-chip (SoC) in which a plurality of elements are integrated on a single chip. The system controller 130 includes the read/write (R/W) channel 40, a hard disk controller (HDC) 50, and a microprocessor (MPU) 60. The R/W channel 40, the HDC 50, and the MPU 60 are electrically connected to one another. The system controller 130 is electrically connected to, for example, the driver IC 20, the head amplifier IC 30, the volatile memory 70, the nonvolatile memory 80, the buffer memory 90, the host 100, and the like.

In response to an instruction from the MPU 60 described later, the R/W channel 40 executes signal processing of data transferred from the disk 10 to the host 100, for example, read data and data transferred from the host 100, for example, write data. The R/W channel 40 is electrically connected to, for example, the head amplifier IC 30, the HDC 50, the MPU 60, and the like. The R/W channel 40 has a circuit or a function for modulating write data. The R/W channel 40 has a circuit or a function of measuring the signal quality of read data and a circuit or a function of decoding read data. The R/W channel 40 is electrically connected to the head amplifier IC 30 and the like.

The HDC 50 controls data transfer. The HDC 50 controls data transfer between the host 100 and the disk 10 in response to an instruction from the MPU 60 described later. The HDC 50 is electrically connected to, for example, the head amplifier IC 30, the R/W channel 40, the MPU 60, the volatile memory 70, the nonvolatile memory 80, the buffer memory 90, and the like.

The MPU 60 is a main controller that controls each section of the magnetic disk device 1. The MPU 60 controls the VCM 14 via the driver IC 20 to execute servo control for positioning the head 15. The MPU 60 controls the SPM 12 via the driver IC 20 to rotate the disk 10. The MPU 60 controls a write operation of data to the disk 10 and selects a storage destination of data transferred from the host 100, for example, write data. The MPU 60 controls a read operation of data from the disk 10 and controls processing of data transferred from the disk 10 to the host 100, for example, read data. The MPU 60 manages a region in which data is recorded. The MPU 60 is connected to each section of the magnetic disk device 1. The MPU 60 is electrically connected to, for example, the driver IC 20, the R/W channel 40, the HDC 50, and the like.

The MPU 60 includes a read/write control section 610, a servo pattern write section 620, and a positioning control section 630. The MPU 60 executes, on firmware, processing of these sections, for example, the read/write control section 610, the servo pattern write section 620, the positioning control section 630, and the like. The MPU 60 may include, as circuits, these sections, for example, the read/write control section 610, the servo pattern write section 620, the positioning control section 630, and the like.

The read/write control section 610 controls read processing and write processing of data according to a command or the like from the host 100. The read/write control section 610 controls the VCM 14 via the driver IC 20, positions the head 15 at a predetermined radial position on the disk 10, and executes read processing or write processing. Hereinafter, "write processing" and "read processing" are sometimes collectively referred to as "access" or "access processing".

The servo pattern write section 620 writes a servo pattern on the disk 10. The servo pattern write section 620 writes the spiral servo pattern SSP and the product servo pattern PSV on the disk 10.

The servo pattern write section 620 writes the spiral servo pattern SSP on the disk 10. In a process (hereinafter, sometimes referred to as BDW process) of blank disk writing (BDW) (or blank disk servo write) of sequentially writing the spiral servo pattern SSP to the disk 10 on which no data and no pattern are written (hereinafter, sometimes referred to as blank state), the servo pattern write section 620 writes the spiral servo pattern SSP to the disk 10 in the blank state at a predetermined speed (hereinafter, sometimes referred to as spiral speed). In the BDW process, the servo pattern write section 620 cannot read data, a pattern, or the like by the disk 10 in the state of blank, and thus the servo pattern write section 620 does not execute read processing (or on-track), and writes the spiral servo pattern SSP into the disk 10 in an inner direction in the radial direction, for example, from the innermost circumference IMC to an outer direction, for example, the outermost circumference OMC by controlling the head 15 at a constant speed at a predetermined spiral speed according to speed information (hereinafter, sometimes referred to as counter electromotive speed information) of the head 15 with respect to the disk 10 based on a counter electromotive voltage generated from the VCM 14 with the position (hereinafter, sometimes referred to as clock reference position) of the disk 10 corresponding to a reference clock once per circle of the disk 10 in the state of blank as a start point. In the BDW process, the servo pattern write section 620 may write the spiral servo pattern SSP to the disk 10 in an outer direction in the radial direction, for example, from the outermost circumference OMC to an inner direction, for example, the innermost circumference IMC by controlling the head 15 at a constant speed at a predetermined spiral speed according to the counter electromotive speed information with the clock reference position of the disk 10 in the state of blank as a start point.

The servo pattern write section 620 writes the spiral servo pattern SSP while accelerating the head 15 until reaching a predetermined spiral speed in a range from a clock reference position that is the start point of the disk 10 in the state of blank to a position where the constant speed control of the head 15 is started. When the head 15 reaches the position where the constant speed control of the head 15 is started, the servo pattern write section 620 writes this spiral servo pattern SSP by controlling the head 15 at a constant speed at a predetermined spiral speed in a range from the position where the constant speed control of the head 15 of the disk 10 in the state of blank is started to the position where deceleration of the head 15 is started. When the head 15 reaches the position where deceleration of the head 15 is started, the servo pattern write section 620 writes the spiral servo pattern SSP while decelerating the head 15 from a predetermined speed to a predetermined speed in a range from the position where the deceleration of the disk 10 in the state of blank is started to the end point. Hereinafter, a state in which the head 15 is accelerated to reach a predetermined speed in a range from the start point to the position where the constant speed control of the head 15 is started is sometimes referred to as an acceleration state, an acceleration time, or an acceleration control, a state in which the head 15 is written at a constant speed is sometimes referred to as a constant speed state, a constant speed time, or a constant speed control, and a state in which the head 15 is decelerated to reach a predetermined speed in a range from the position where the deceleration of the head 15 is started to the end point is sometimes referred to as a deceleration state, a deceleration time, or a deceleration control. Note that "speed at a constant speed time of the head 15 that writes a spiral servo pattern" is sometimes referred to as "spiral speed", "speed at an acceleration time of the head 15 that writes a spiral servo pattern" is sometimes referred to as "spiral speed", and "speed at a deceleration time of the head 15 that writes a spiral servo pattern" is sometimes referred to as "spiral speed". "Speed at (an acceleration time, a constant speed time, and a deceleration time of) the head 15 that writes a spiral servo pattern" are sometimes collectively referred to as "spiral speed".

The servo pattern write section 620 overwrites the plurality of spiral servo patterns SSP on the disk 10. In other words, the servo pattern write section 620 overwrites another spiral servo pattern (hereinafter, it is sometimes simply referred to as other spiral servo pattern) SSP different from this spiral servo pattern on a part in the radial direction of the predetermined spiral servo pattern SSP on the disk 10. Note that the servo pattern write section 620 may overwrite the other spiral servo pattern SSP without shifting with respect to the predetermined spiral servo pattern SSP unless overwritten on the completely same track on the disk 10, that is, if slightly shifted. Hereinafter, "a plurality of overwritten spiral servo patterns" are sometimes referred to as "overwritten spiral servo pattern" or simply as "spiral servo pattern". A "spiral servo pattern not overwritten" and "one spiral servo pattern" are sometimes referred to as "normal spiral servo pattern" or simply as "spiral servo pattern". The servo pattern write section 620 may write the overwritten spiral servo pattern over the entire surface of the disk 10. The servo pattern write section 620 may write the overwritten spiral servo pattern on a part of the disk 10. In other words, the servo pattern write section 620 may mix and write the overwritten spiral servo pattern and the normal spiral servo pattern on the disk 10.

For example, the width of the normal spiral servo pattern SSP is smaller than the width of the overwritten spiral servo pattern SSP. In other words, the width of the overwritten spiral servo pattern SSP is larger than the width of the normal spiral servo pattern SSP. The width of the normal spiral servo pattern SSP corresponds to the width of the write head 15W, for example. The width of the normal spiral servo pattern SSP may be smaller than the width of the write head 15W or may be larger than the width of the write head 15W. The width of the overwritten spiral servo pattern SSP is larger than the width of the write head 15W, for example. The width of the overwritten spiral servo pattern SSP may be, for example, smaller than the width of the write head 15W or may be the same as the width of the write head 15W.

The servo pattern write section 620 overwrites the plurality of spiral servo patterns (normal spiral servo patterns) SSP on the disk 10 in the state of blank. The servo pattern write section 620 writes the overwritten spiral servo pattern SSP by overwriting the plurality of spiral servo patterns SSP on the disk 10 in the state of blank while shifting each of the plurality of spiral servo patterns SSP in one direction (hereinafter, sometimes referred to as forward direction), for example, one direction in the radial direction. The servo pattern write section 620 writes the overwritten spiral servo pattern SSP by overwriting the plurality of spiral patterns (normal spiral servo patterns) SSP on the disk 10 in the state of blank while shifting each of the plurality of spiral patterns at predetermined intervals (hereinafter, sometimes referred to as offset amount) in the radial direction. Hereinafter, one direction in which the plurality of spiral servo patterns (normal spiral servo patterns) SSP are overwritten is sometimes referred to as forward direction. That is, the forward direction corresponds to a direction in which another spiral servo pattern different from this spiral servo pattern is overwritten on a part of a predetermined spiral servo pattern. When writing the overwritten spiral servo pattern SSP, the servo pattern write section 620 may repeatedly write (or overwrite) each normal spiral servo pattern in this overwritten spiral servo pattern at the same position a predetermined number of times (hereinafter, sometimes referred to as number of times of repetition).

For example, the servo pattern write section 620 writes the overwritten spiral servo pattern SSP by overwriting three spiral servo patterns SSP on the disk 10 in the state of blank by shifting each of the three spiral servo patterns SSP by 0.5 tracks in the forward direction. The servo pattern write section 620 may write the overwritten spiral servo pattern SSP by overwriting two spiral servo patterns SSP on the disk 10 in the state of blank by shifting each of the two spiral servo patterns SSP by 0.5 tracks in the forward direction, or may write the overwritten spiral servo pattern SSP by overwriting four or more spiral servo patterns SSP on the disk 10 in the state of blank by shifting each of the four or more spiral servo patterns SSP by 0.5 tracks in the forward direction. The spiral servo pattern SSP is not limited to 0.5 tracks in a range where the written spiral servo pattern SSP overlaps, and the overwritten spiral servo pattern SSP may be written by being overwritten by arbitrarily shifting in a range of 0 to 1, for example.

The servo pattern write section 620 calculates or acquires the center position (hereinafter, sometimes referred to as spiral pattern center position) of the width of the spiral servo pattern SSP. The servo pattern write section 620 acquires a demodulated Magnitude (MAG) value each time a sync mark (Sync) of a read signal (or read signal strength) of the spiral servo pattern SSP is detected, and calculates or acquires, as the spiral pattern center position, a position corresponding to a timing corresponding to half (½) of an integrated value of this demodulated MAG value (hereinafter, sometimes simply referred to as integrated value). The demodulated MAG value corresponds to a value related to the read signal. The demodulated MAG value corresponds to, for example, a signal level or an area. More specifically, the demodulated MAG value can be defined as a square root of a sum of squares of sine and cosine components of a fundamental frequency obtained by discrete-Fourier-transforming the read signal.

For example, the servo pattern write section 620 acquires the demodulated MAG value each time the sync mark of the normal spiral servo pattern SSP is detected, and calculates or acquires, as the spiral pattern center position, a position corresponding to a timing corresponding to half (½) of an integrated value of this demodulated MAG value.

For example, the servo pattern write section 620 acquires the demodulated MAG value each time the sync mark of the overwritten spiral servo pattern SSP is detected, and calculates or acquires, as the spiral pattern center position, a position corresponding to a timing corresponding to half (½) of an integrated value of this demodulated MAG value.

The servo pattern write section 620 writes the product servo pattern PSV on the disk 10. The servo pattern write section 620 writes the product servo pattern PSV based on the spiral servo pattern SSP in the process of self-servo write (SSW) (hereinafter, sometimes referred to as SSW process or SSW processing). In the SSW process, the servo pattern write section 620 writes the product servo pattern PSV in an inner direction in the radial direction, for example, in an outer direction from the innermost circumference IMC, for example, toward the outermost circumference OMC while correcting the shift of the spiral pattern center position using it for position error calculation based on the spiral servo pattern SSP and the spiral pattern center position. In the SSW process, the servo pattern write section 620 may write the product servo pattern PSV in an outer direction in the radial direction, for example, in an inner direction from the outermost circumference OMC, for example, toward the innermost circumference IMC while correcting the shift of the spiral pattern center position using it for position error calculation based on the spiral servo pattern SSP and the spiral pattern center position. Note that the BDW process and the SSW process are sometimes collectively referred to as SSW process. The servo pattern write section 620 may write the spiral servo pattern SSP in the SSW process.

The positioning control section 630 executes positioning control of the head 15. The positioning control section 630 executes positioning control of the head 15 based on the spiral servo pattern SSP, the spiral pattern center position, and the product servo pattern PSV. The positioning control section 630 calculates a position error based on the spiral pattern center position, and executes positioning control of the head 15 based on the position error. In other words, the MPU 60 calculates the position error using the shift of the spiral pattern center position, and executes the positioning control of the head 15 based on the calculated position error.

Figure 3:
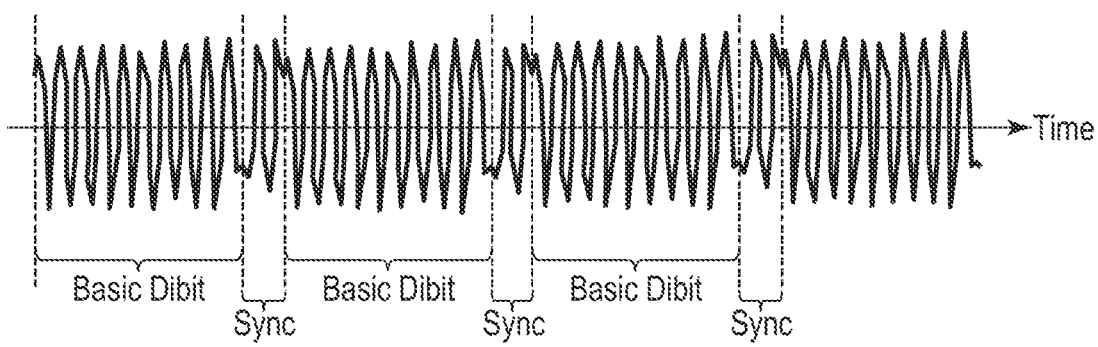
FIG. 3 is a schematic view illustrating an example of a write signal of a spiral servo pattern.

FIG. 3 is a schematic view illustrating an example of a write signal of the spiral servo pattern SSP. In FIG. 3, the horizontal axis represents time. The time on the horizontal axis in FIG. 3 passes toward the tip side of the arrow.

For example, the MPU 60 writes the spiral servo pattern SSP by alternately writing a basic dibit and the sync mark (Sync) onto the disk 10 according to the write signal of the spiral servo pattern SSP as illustrated in FIG. 3.

Figure 4:
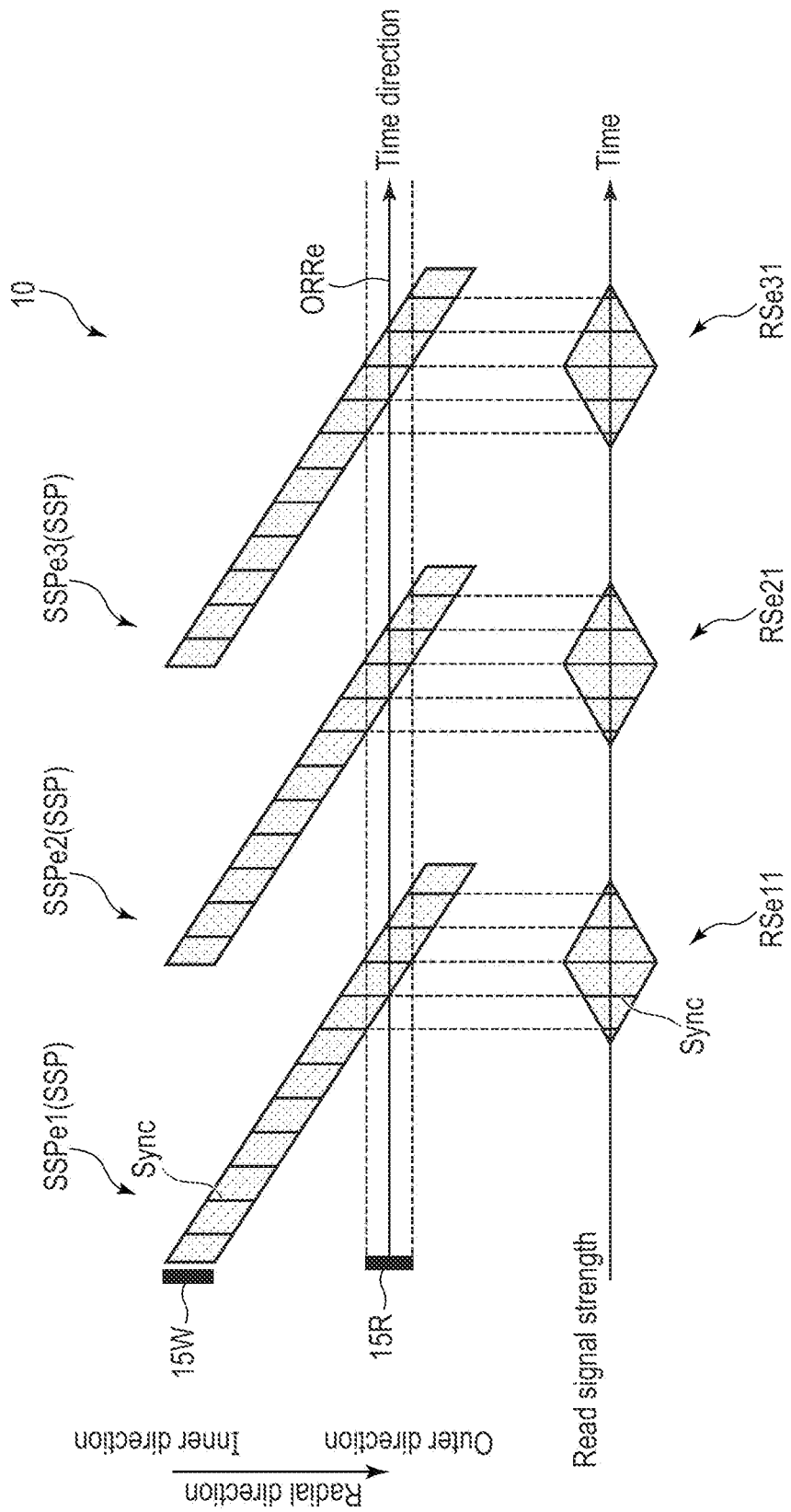
FIG. 4 is a schematic view illustrating an example of a write processing method of a normal spiral servo pattern.

FIG. 4 is a schematic view illustrating an example of the write processing method of the normal spiral servo pattern SSP. FIG. 4 illustrates a radial direction and a direction (hereinafter, sometimes referred to as time direction) advancing with the lapse of time while the spiral servo pattern SSP is written. The radial direction in FIG. 4 advances in an outer direction toward the tip side of the arrow, and advances in an inner direction toward the side opposite to the tip side of the arrow. FIG. 4 illustrates normal spiral servo patterns SSPe1 (SSP), SSPe2 (SSP), and SSPe3 (SSP) continuously arranged at predetermined intervals on the disk 10. In the normal spiral servo patterns SSPe1 (SSP), SSPe2 (SSP), and SSPe3 (SSP) in FIG. 4, vertical lines correspond to the sync mark (Sync). In the example illustrated in FIG. 4, the widths of the normal spiral servo patterns SSPe1, SSPe2, and SSPe3 correspond to the width of the write head 15W. FIG. 4 illustrates a path (hereinafter, sometimes referred to as on-track path) ORRe of the read head 15R with respect to the normal spiral servo pattern SSP (SSPe1, SSPe2, and SSPe3) during on-track. In FIG. 4, the normal spiral servo patterns SSPe1 (SSP), SSPe2 (SSP), and SSPe3 (SSP) are illustrated as extending obliquely in a band shape for convenience of description, but can be spirally arranged on the disk 10 actually. FIG. 4 illustrates the magnitude or the read signal strength (hereinafter, sometimes referred to as read signal strength during on-track) RSe11, RSe21, and RSe31 of the read signal when the normal spiral servo pattern SSP (SSPe1, SSPe2, and SSPe3) is read by the read head 15R during on-track. FIG. 4 illustrates time. The time in FIG. 4 passes toward the tip side of the arrow. The read signal strength RSe11 during on-track corresponds to the magnitude of a signal read by the read head 15R where the normal spiral servo pattern SSPe1 is put on-track (or arranged in a predetermined track). The read signal strength RSe21 during on-track corresponds to the magnitude of a signal read by the read head 15R where the normal spiral servo pattern SSPe2 is put on-track. The read signal strength RSe31 during on-track corresponds to the magnitude of a signal read by the read head 15R where the normal spiral servo pattern SSPe3 is put on-track. In the read signal strengths RSe11, RSe21, and RSe31 during on-track, the vertical line corresponds to the read signal strength where the sync mark (Sync) is read.

In the example illustrated in FIG. 4, the MPU 60 writes the normal spiral servo patterns SSPe1, SSPe2, and SSPe3 onto the disk 10 at intervals in the time direction. The MPU 60 puts the read head 15R on-track according to the on-track path ORRe, reads the normal spiral servo patterns SSPe1, SSPe2, and SSPe3, and acquires the read signal strengths RSe11, RSe21, and RSe31 during on-track.

Figure 5:
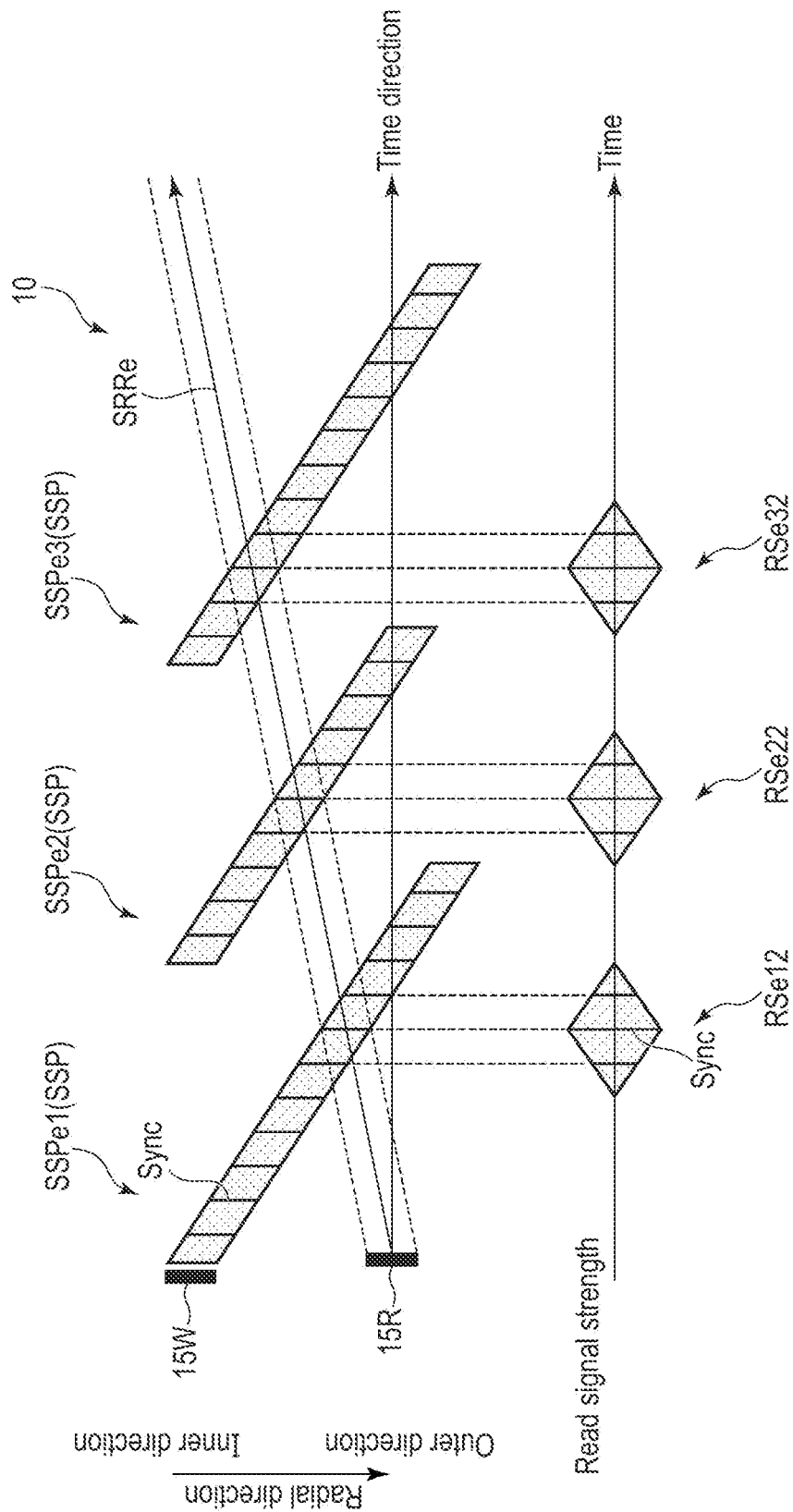
FIG. 5 is a schematic view illustrating an example of the write processing method of the normal spiral servo pattern.

FIG. 5 is a schematic view illustrating an example of the write processing method of the normal spiral servo pattern. FIG. 5 illustrates the normal spiral servo patterns SSPe1 (SSP), SSPe2 (SSP), and SSPe3 (SSP) illustrated in FIG. 4. FIG. 5 illustrates a path (hereinafter, sometimes referred to as seek path) SRRe of the read head 15R with respect to the normal spiral servo pattern SSP (SSPe1, SSPe2, and SSPe3) during seek. FIG. 5 illustrates the read signal strengths (hereinafter, sometimes referred to as read signal strength during seek) RSe12, RSe22, and RSe32 when the normal spiral servo pattern SSP (SSPe1, SSPe2, and SSPe3) is read by the read head 15R during seek. The read signal strength RSe12 during seek corresponds to the magnitude of a signal read by the read head 15R seeking the spiral servo pattern SSPe1. The read signal strength RSe22 during seek corresponds to the magnitude of a signal read by the read head 15R seeking the spiral servo pattern SSPe2. The read signal strength RSe32 during seek corresponds to the magnitude of a signal read by the read head 15R seeking the spiral servo pattern SSPe3.

In the example illustrated in FIG. 5, the MPU 60 seeks the read head 15R according to the seek path SRRe, reads the normal spiral servo patterns SSPe1, SSPe2, and SSPe3, and acquires the read signal strengths RSe12, RSe22, and RSe32 during seek.

In the example illustrated in FIG. 5, since the read signal strengths RSe12, RSe22, and RSe32 during seek are smaller than the read signal strengths RSe11, RSe21, and RSe31 during on-track, the number of sync marks (Sync) read by the read head 15R during seeking is smaller than the number of sync marks (Sync) read by the read head 15R during on-track.

Figure 6:
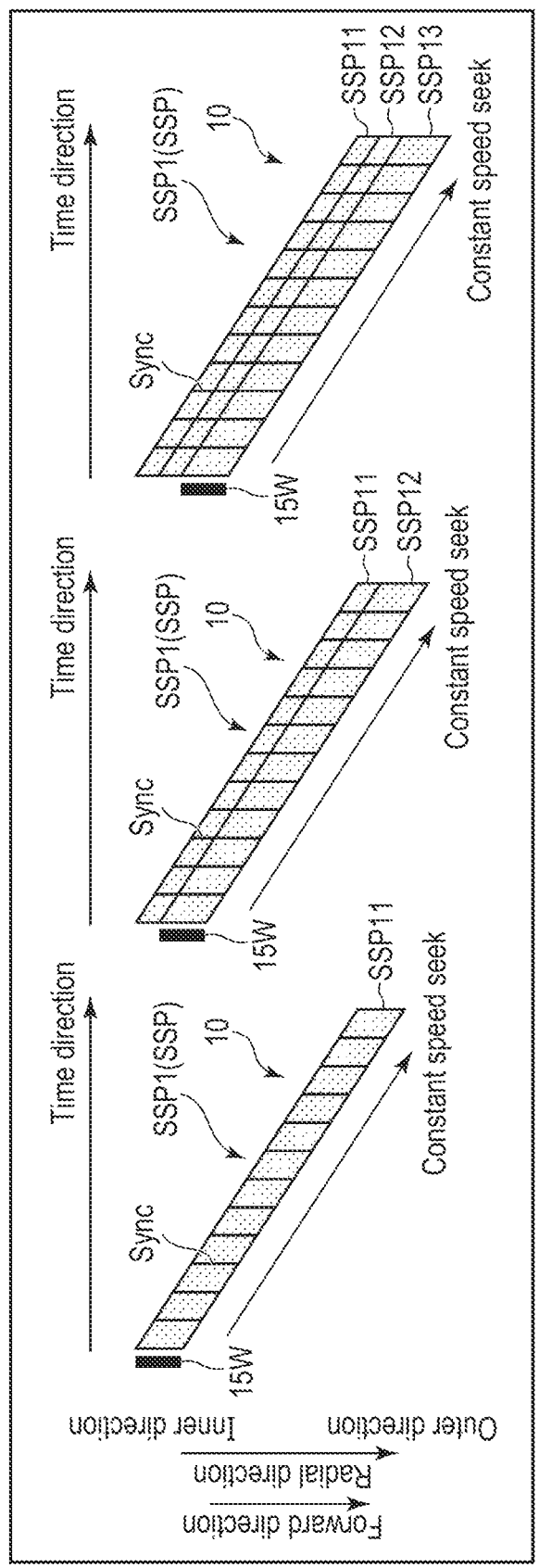
FIG. 6 is a schematic view illustrating an example of a write processing method of an overwritten spiral servo pattern according to the present embodiment.

FIG. 6 is a schematic view illustrating an example of the write processing method of the overwritten spiral servo pattern SPP1 according to the present embodiment. FIG. 6 illustrates the radial direction and the time direction. In FIG. 6, the forward direction corresponds to the outer direction. The forward direction may be the inner direction or a direction other than the inner direction and the outer direction. FIG. 6 illustrates an overwritten spiral servo pattern SSP1 (SSP). In FIG. 6, for example, the overwritten spiral servo pattern SSP1 is configured by overwriting normal spiral servo patterns SSP11, SSP12, and SSP13 in the described order. In other words, the overwritten spiral servo pattern SSP1 includes the normal spiral servo patterns SSP11, SSP12, and SSP13. In the normal spiral servo patterns SSP11, SSP12, and SSP13 illustrated in FIG. 6, the vertical lines correspond to sync marks (Sync). In FIG. 6, the overwritten spiral servo pattern SSP1 (SSP) and the normal spiral servo patterns SSP11, SSP12, and SSP13 are illustrated as extending obliquely in a band shape for convenience of description, but actually can be arranged spirally on the disk 10.

In the example illustrated in FIG. 6, the MPU 60 writes the normal spiral servo pattern SSP11 to the disk 10 at a predetermined spiral speed. After writing the normal spiral servo pattern SSP11, the MPU 60 overwrites the normal spiral servo pattern SSP12 by shifting the normal spiral servo pattern SSP11 by a predetermined offset amount in the forward direction at a predetermined spiral speed. After overwriting the normal spiral servo pattern SSP12 on the normal spiral servo pattern SSP11, the MPU 60 writes the overwritten spiral servo pattern SSP1 by overwriting the normal spiral servo pattern SSP13 by shifting the normal spiral servo pattern SSP12 by a predetermined offset amount in the forward direction at a predetermined spiral speed.

FIG. 7 is a schematic view illustrating an example of a table TB1 of an offset amount of the overwritten spiral servo pattern according to the present embodiment. FIG. 7 illustrates the table TB1 of the offset amount corresponding to the overwritten spiral servo pattern SSP1 illustrated in FIG. 6. The table TB1 includes a number (hereinafter, sometimes referred to as overwriting number) corresponding to the order of overwriting the spiral servo pattern in the overwritten spiral servo pattern, an offset amount with respect to the spiral servo pattern SSP1 of the overwriting number 1, and the number of times of repetition of each spiral servo pattern SSP. The table TB1 may be recorded in a predetermined record region, for example, the disk 10, the volatile memory 70, the nonvolatile memory 80, or the buffer memory 90.

In the example illustrated in FIG. 7, after writing the normal spiral servo pattern SSP11, the MPU 60 overwrites the normal spiral servo pattern SSP12 by shifting −0.5 tracks in the forward direction with respect to the normal spiral servo pattern SSP11 at a predetermined spiral speed as illustrated in the table TB1. After overwriting the normal spiral servo pattern SSP12 on the normal spiral servo pattern SSP11, the MPU 60 writes the overwritten spiral servo pattern SSP1 by overwriting the normal spiral servo pattern SSP13 on the normal spiral servo pattern SSP12 by shifting −1.0 tracks in the forward direction with respect to the normal spiral servo pattern SSP11 at a predetermined spiral speed.

Figure 8:
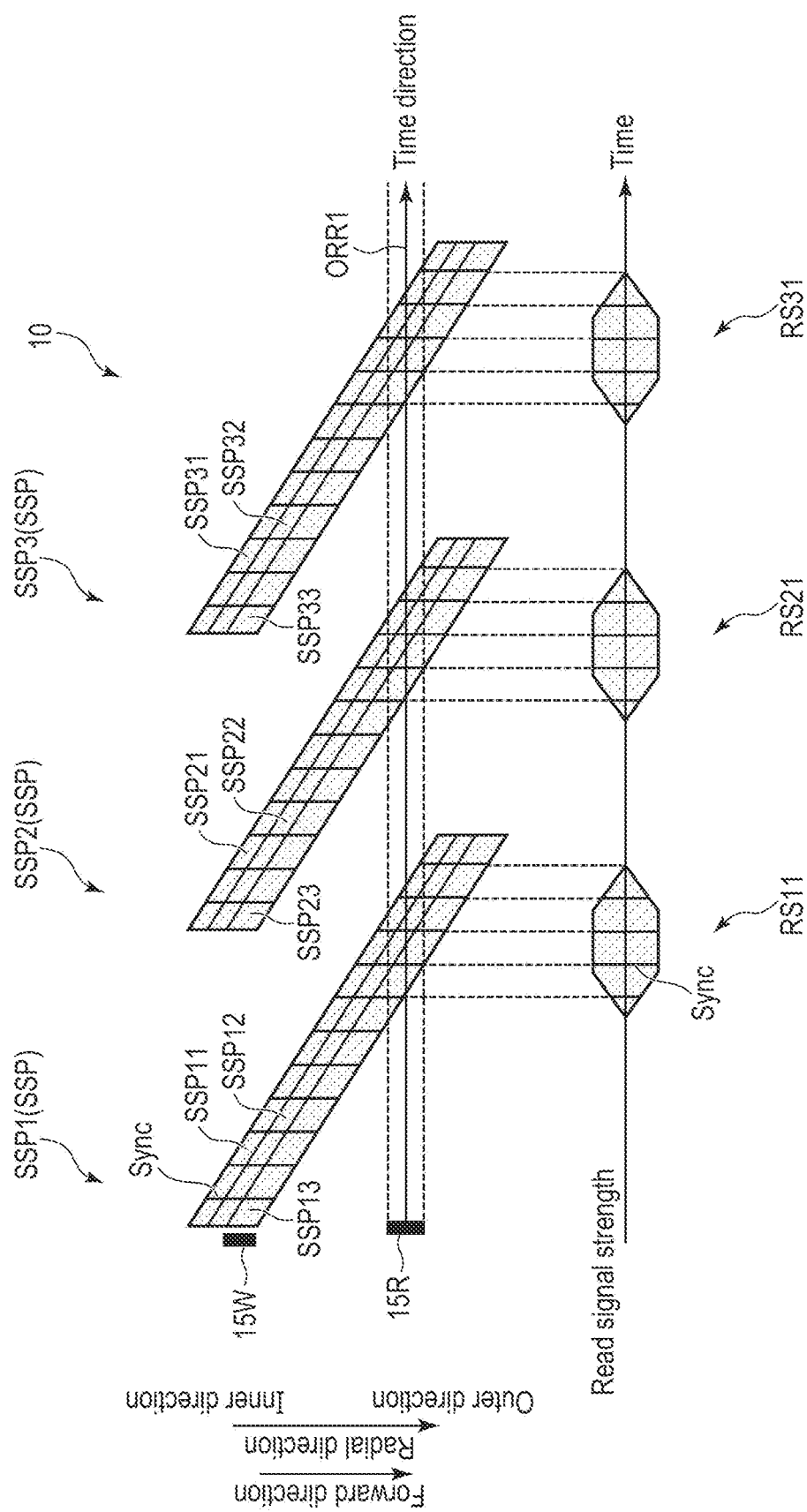
FIG. 8 is a schematic view illustrating an example of the write processing method of the overwritten spiral servo pattern according to the present embodiment.

FIG. 8 is a schematic view illustrating an example of the write processing method of the overwritten spiral servo pattern according to the present embodiment. FIG. 8 illustrates the radial direction, the forward direction, and the time direction. FIG. 8 illustrates overwritten spiral servo patterns SSP1 (SSP), SSP2 (SSP), and SSP3 (SSP) continuously arranged on the disk 10 at predetermined intervals. In the overwritten spiral servo patterns SSP1, SSP2, and SSP3 of FIG. 8, vertical lines correspond to sync marks (Sync). In FIG. 8, the overwritten spiral servo pattern SSP1 includes the normal spiral servo patterns SSP11, SSP12, and SSP13. The overwritten spiral servo pattern SSP2 includes normal spiral servo patterns SSP21, SSP22, and SSP23. The overwritten spiral servo pattern SSP3 includes normal spiral servo patterns SSP31, SSP32, and SSP33. In the example illustrated in FIG. 8, the widths of the normal spiral servo patterns SSP11, SSP12, SSP13, SSP21, SSP22, SSP23, SSP31, SSP32, and SSP33 correspond to the width of the write head 15W. FIG. 8 illustrates an on-track path ORR1 of the read head 15R with respect to the overwritten spiral servo pattern SSP (SSP1, SSP2, and SSP3) during on-track. In FIG. 8, the overwritten spiral servo patterns SSP1 (SSP), SSP2 (SSP), and SSP3 (SSP) are illustrated as extending obliquely in a band shape for convenience of description, but are actually arranged spirally on the disk 10. FIG. 8 illustrates read signal strengths RS11, RS21, and RS31 during on-track. FIG. 8 illustrates time. The read signal strength RS11 during on-track corresponds to the magnitude of a signal read by the read head 15R where the overwritten spiral servo pattern SSP1 is put on-track. The read signal strength RS21 during on-track corresponds to the magnitude of a signal read by the read head 15R where the overwritten spiral servo pattern SSP2 is put on-track. The read signal strength RS31 during on-track corresponds to the magnitude of a signal read by the read head 15R where the overwritten spiral servo pattern SSP3 is put on-track. In the read signal strengths RS11, RS21, and RS31 during on-track, the vertical line corresponds to the read signal strength at which the sync mark is read.

In the example illustrated in FIG. 8, the MPU 60 writes the overwritten spiral servo pattern SSP1 by overwriting the normal spiral servo patterns SSP11, SSP12, and SSP13 in the forward direction on the disk 10. The MPU 60 writes the overwritten spiral servo pattern SSP2 by overwriting the normal spiral servo patterns SSP21, SSP22, and SSP23 in the forward direction at intervals in the time direction from the overwritten spiral servo pattern SSP1. The MPU 60 writes the overwritten spiral servo pattern SSP3 by overwriting the normal spiral servo patterns SSP31, SSP32, and SSP33 in the forward direction at intervals in the time direction from the overwritten spiral servo pattern SSP2.

In the example illustrated in FIG. 8, the MPU 60 puts the read head 15R on-track according to the on-track path ORR1, reads the overwritten spiral servo patterns SSP1, SSP2, and SSP3, and acquires the read signal strengths RS11, RS21, and RS31 during on-track.

Since the read signal strengths RS11, RS21, and RS31 during on-track are larger than the read signal strengths RSe11, RSe21, and RSe31 during on-track, the number of sync marks (Sync) for reading the overwritten spiral servo pattern SSP by the read head 15R during on-track is larger than the number of sync marks (Sync) for reading the normal spiral servo pattern SSP in the read head 15R during on-track.

FIG. 9 is a schematic view illustrating an example of the write processing method of the overwritten spiral servo pattern according to the present embodiment. FIG. 9 illustrates the overwritten spiral servo patterns SSP1 (SSP), SSP2 (SSP), and SSP3 (SSP) illustrated in FIG. 8. FIG. 9 illustrates a seek path SRR1 of the read head 15R with respect to the overwritten spiral servo pattern SSP (SSP1, SSP2, and SSP3) during seek. FIG. 9 illustrates read signal strengths RS12, RS22, and RS32 during seek. The read signal strength RS12 during seek corresponds to the magnitude of a signal read by the read head 15R seeking the overwritten spiral servo pattern SSP1. The read signal strength RS22 during seek corresponds to the magnitude of a signal read by the read head 15R seeking the overwritten spiral servo pattern SSP2. The read signal strength RS32 during seek corresponds to the magnitude of a signal read by the read head 15R seeking the overwritten spiral servo pattern SSP3.

In the example illustrated in FIG. 9, the MPU 60 reads the overwritten spiral servo patterns SSP1, SSP2, and SSP3 while seeking the read head 15R according to the seek path SRR1, and acquires the read signal strengths RS12, RS22, and RS32 during seek.

In the example illustrated in FIG. 9, since the read signal strengths RS12, RS22, and RS32 during seek are larger than the read signal strengths RSe12, RSe22, and RSe32 during seek, the number of sync marks (Sync) read from the overwritten spiral servo pattern SSP by the read head 15R during seeking is larger than the number of sync marks (Sync) read from the normal spiral servo pattern SSP by the read head 15R during seeking.

FIG. 10 is a schematic view illustrating an example of a calculation method of the spiral pattern center position of the normal spiral servo pattern SSPe1. FIG. 10 illustrates the normal spiral servo pattern SSPe1 illustrated in FIG. 4, the on-track path ORRe, and the read signal strength during on-track of the normal spiral servo pattern SSPe1. FIG. 10 illustrates the demodulated MAG value (hereinafter, sometimes referred to as on-track normal demodulated MAG value) corresponding to the read signal strength RSe1 during on-track of the normal spiral servo pattern SSPe1, and the integrated value (hereinafter, sometimes referred to as on-track normal integrated value or an integrated value) of the demodulated MAG value corresponding to this on-track normal demodulated MAG value. The horizontal axes of the on-track normal demodulated MAG value and the on-track normal integrated value are time.

In the example illustrated in FIG. 10, the MPU 60 acquires each on-track normal demodulated MAG value corresponding to each timing at which the sync mark (Sync) is detected based on the read signal strength during on-track of the normal spiral servo pattern SSPe1. The MPU 60 calculate an on-track normal integrated value by integrating each on-track normal demodulation MAG corresponding to each timing at which the sync mark based on the read signal strength during on-track of the acquired normal spiral servo pattern SSPe1 is detected, and calculates or acquires the position corresponding to half (½) of this on-track normal integrated value as a spiral pattern center position of the normal spiral servo pattern SSPe1. The MPU 60 may record the spiral pattern center position of the normal spiral servo pattern SSPe1 having been calculated into a predetermined record region, for example, the disk 10, the volatile memory 70, the nonvolatile memory 80, or the buffer memory 90.

Figure 11:
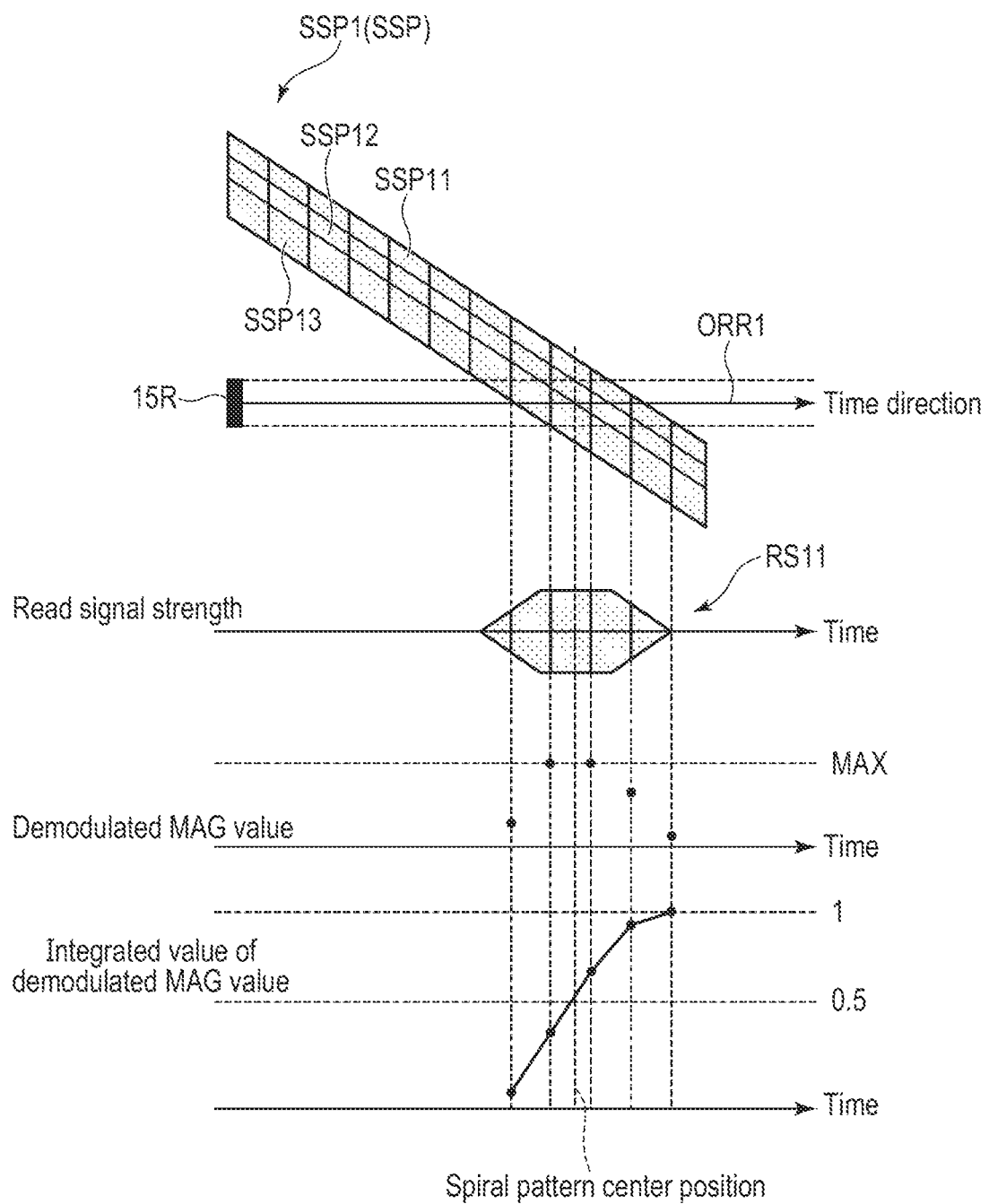
FIG. 11 is a schematic view illustrating an example of a calculation method of a spiral pattern center position of the overwritten spiral servo pattern according to the present embodiment.

FIG. 11 is a schematic view illustrating an example of the calculation method of the spiral pattern center position of the overwritten spiral servo pattern SSP1 according to the present embodiment. FIG. 11 illustrates the overwritten spiral servo pattern SSP1 illustrated in FIG. 8, the on-track path ORR1, and the read signal strength RS11 during on-track of the overwritten spiral servo pattern SSP1. FIG. 11 illustrates the demodulated MAG value (hereinafter, sometimes referred to as on-track overwritten demodulated MAG value) corresponding to the read signal strength RS11 during on-track of the overwritten spiral servo pattern SSP1, and the integrated value (hereinafter, sometimes referred to as on-track overwritten integrated value or an integrated value) of the demodulated MAG value corresponding to this on-track overwritten demodulated MAG value. The horizontal axes of the on-track overwritten demodulated MAG value and the on-track overwritten integrated value are time.

In the example illustrated in FIG. 11, the MPU 60 acquires each on-track overwritten demodulated MAG value corresponding to each timing at which the sync mark (Sync) is detected based on the read signal strength RS11 during on-track of the overwritten spiral servo pattern SSP1. The MPU 60 calculate the on-track overwritten integrated value by integrating each on-track overwritten demodulated MAG value corresponding to each timing at which the sync mark based on the read signal strength RS1 during on-track of the acquired overwritten spiral servo pattern SSP1 is detected, and calculates or acquires the position corresponding to half (½) of this on-track overwritten integrated value as a spiral pattern center position of the overwritten spiral servo pattern SSP1. The MPU 60 may record the spiral pattern center position of the overwritten spiral servo pattern SSP1 having been calculated into a predetermined record region, for example, the disk 10, the volatile memory 70, the nonvolatile memory 80, or the buffer memory 90.

Figure 12:
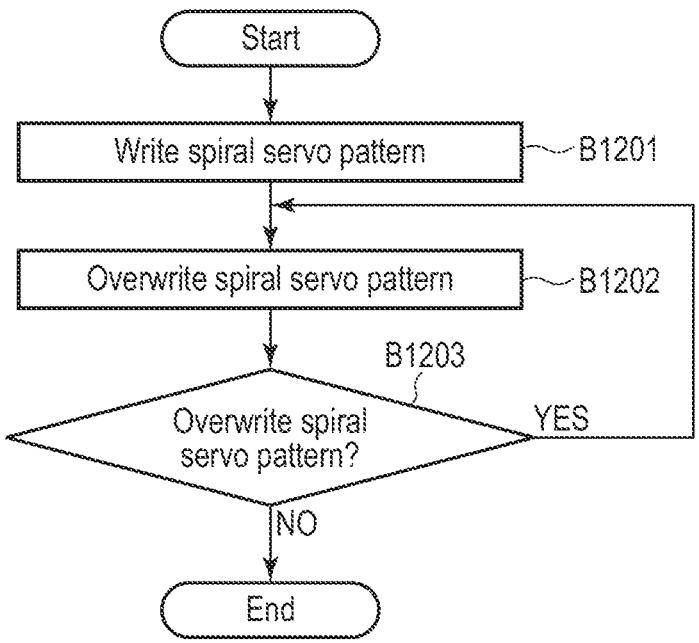
FIG. 12 is a flowchart illustrating an example of a servo pattern write method according to the present embodiment.

FIG. 12 is a flowchart illustrating an example of a servo pattern write method according to the present embodiment.

The MPU 60 writes the predetermined spiral servo pattern (normal spiral servo pattern) SSP on the disk 10 (B1201), shifts a predetermined offset amount in the forward direction, overwrites the other spiral servo pattern (normal spiral servo pattern) SSP on the spiral servo pattern (normal spiral servo pattern) SSP, and thus writes the overwritten spiral servo pattern SSP (B1202). The MPU 60 determines whether to overwrite or not the spiral servo pattern (normal spiral servo pattern) SSP (B1203).

If determining to overwrite the spiral servo pattern (normal spiral servo pattern) SSP (YES in B1203), the MPU 60 proceeds to the processing of B1202. If determining not to overwrite the spiral servo pattern (normal spiral servo pattern) SSP (NO in B1203), the MPU 60 ends the processing.

Figure 13:
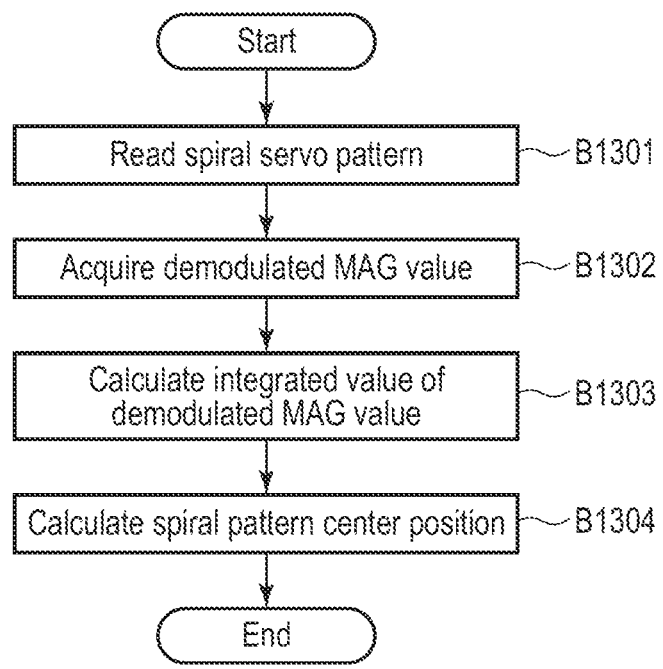
FIG. 13 is a flowchart illustrating an example of the servo pattern write method according to the present embodiment.

FIG. 13 is a flowchart illustrating an example of the servo pattern write method according to the present embodiment.

The MPU 60 reads the spiral servo pattern SSP (B1301), and acquires each demodulated MAG value each time the sync mark of the read signal of the spiral servo pattern SSP is detected (B1302). The MPU 60 calculates the integrated value of the demodulated MAG value corresponding to this spiral servo pattern SSP (B1303), calculates the position corresponding to the timing corresponding to half (½) of the integrated value of this demodulated MAG value as the spiral pattern center position (B1304), and ends the processing.

According to the present embodiment, the magnetic disk device 1 writes the overwritten spiral servo pattern SSP by overwriting the plurality of normal spiral servo patterns SSP each shifted in the forward direction on the disk 10. The magnetic disk device 1 acquires the demodulated MAG value each time the sync mark of the read signal of the spiral servo pattern SSP is detected, and calculates the position corresponding to the timing corresponding to half (½) of the integrated value of this demodulated MAG value as a spiral pattern center position. Therefore, the magnetic disk device 1 can reduce defects and the like in the SSW process even in the head 15 having a narrow write width. Therefore, the magnetic disk device 1 can improve reliability.

Next, a magnetic disk device according to an embodiment other than the first embodiment will be described. In the other embodiment, the identical parts to those in the first embodiment described above are given the identical reference numerals, and detailed description thereof will be omitted.

Second Embodiment

A magnetic disk device 1 according to the second embodiment is different in the write processing method of the spiral servo pattern SSP from the magnetic disk device 1 of the first embodiment described above.

The MPU 60 writes the overwritten spiral servo pattern SSP, and writes (or overwrites) an erase pattern in this overwritten spiral servo pattern SSP. Since both ends (hereinafter, sometimes simply referred to as both ends of the erase pattern) in the width direction, for example, the radial direction, of the erase pattern in the overwritten spiral servo pattern desirably have the same shape, the MPU 60 writes (or overwrites) the erase pattern only once in the center part of the width of the overwritten spiral servo pattern SSP. Note that the MPU 60 may write (or overwrite) the erase pattern in other than the center part of the width of the overwritten spiral servo pattern SSP. The MPU 60 may write (or overwrite) the erase pattern a plurality of times in the overwritten spiral servo pattern SSP. The erase pattern corresponds to an AC erase pattern having a frequency higher than the frequency of predetermined data, for example, a normal spiral servo pattern. The erase pattern corresponds to an AC erase pattern having a frequency several times the frequency of the normal spiral servo pattern, for example, four times higher.

The MPU 60 calculates or acquires the center position (hereinafter, sometimes referred to as erase pattern center position) of the width of the erase pattern of the overwritten spiral servo pattern (hereinafter, sometimes referred to as overwritten erase spiral pattern) SSP in which the erase pattern is overwritten. The MPU 60 acquires the demodulated MAG value (hereinafter, sometimes referred to as erase spiral demodulated MAG value) each time the sync mark (Sync) of the read signal (or read signal strength) of the overwritten erase spiral pattern SSP is detected. The MPU 60 calculates each difference value (hereinafter, sometimes referred to as erase spiral difference value) between the maximum erase spiral demodulated MAG value (hereinafter, sometimes referred to as maximum erase spiral demodulated MAG value or a demodulated MAG value) in a region not including the erase pattern in the erase spiral demodulated MAG value of the overwritten erase spiral pattern and each erase spiral demodulated MAG value (hereinafter, sometimes referred to as erase demodulated MAG value or a demodulated MAG value) in a region including the erase pattern of the overwritten erase spiral pattern. The MPU 60 calculates an integrated value (hereinafter, sometimes referred to as difference integrated value or an integrated value) in which each erase spiral difference value is integrated, and calculates or acquires the position corresponding to the timing corresponding to half (½) of that difference integrated value as an erase pattern center position.

The MPU 60 calculates a position error based on the erase pattern center position, and executes positioning control of the head 15 based on the calculated position error. In other words, the MPU 60 calculates the position error using shift of the erase pattern center position, and executes the positioning control of the head 15 based on the calculated position error.

Figure 14:
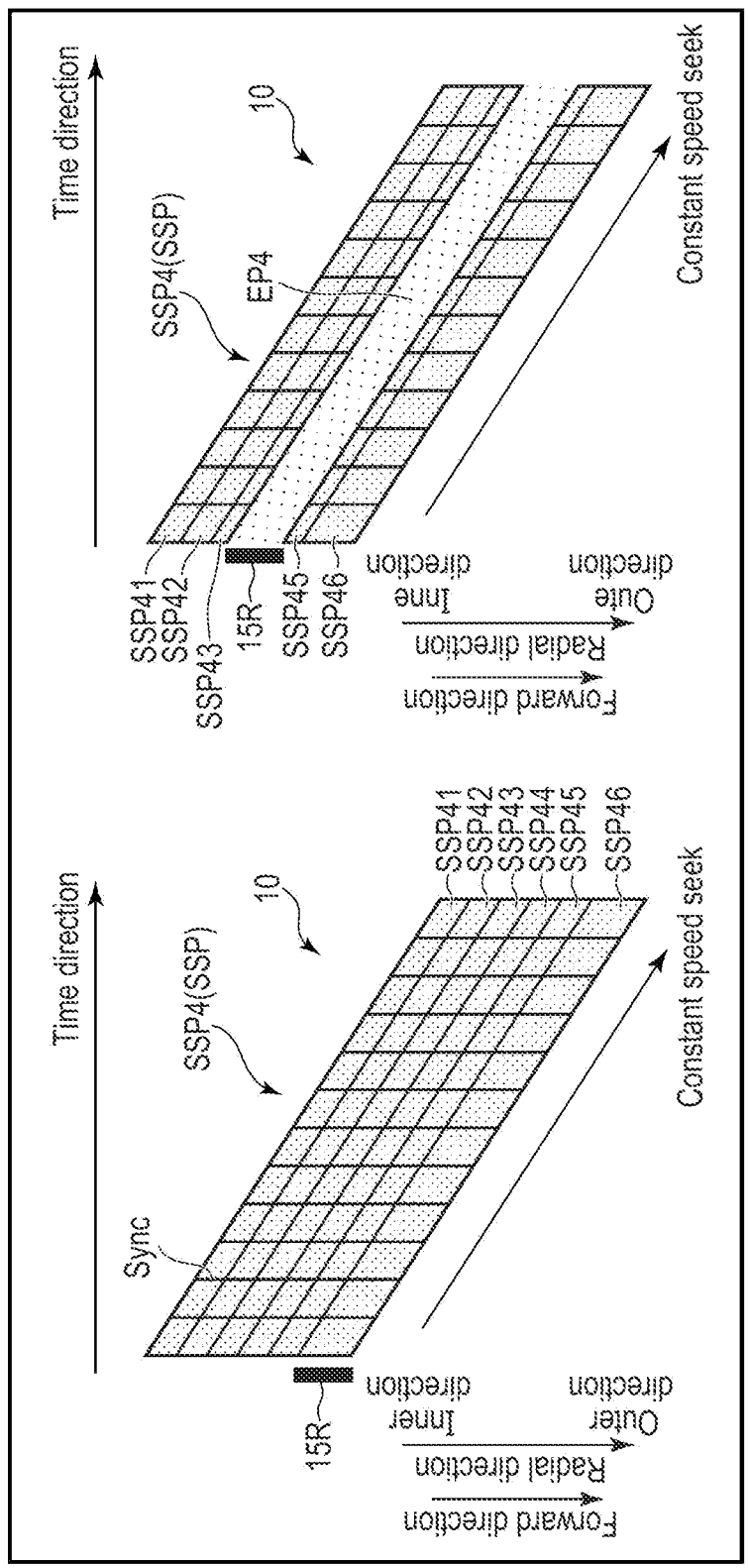
FIG. 14 is a schematic view illustrating an example of a write processing method of an overwritten erase spiral pattern according to the present embodiment.

FIG. 14 is a schematic view illustrating an example of the write processing method of an overwritten erase spiral pattern SSP4 according to the present embodiment. FIG. 14 illustrates the radial direction, the forward direction, and the time direction. In FIG. 14, the forward direction corresponds to the outer direction. The forward direction may be the inner direction or a direction other than the inner direction and the outer direction.

FIG. 14 illustrates the overwritten erase spiral pattern SSP4 (SSP). In FIG. 14, for example, the overwritten erase spiral pattern SSP4 includes normal spiral servo patterns SSP41, SSP42, SSP43, SSP44, SSP45, and SSP46 and an erase pattern EP4. In the normal spiral servo patterns SSP41, SSP42, SSP43, SSP44, SSP45, and SSP46 illustrated in FIG. 14, the vertical lines correspond to sync marks (Sync). In FIG. 14, the overwritten erase spiral pattern SSP4, the normal spiral servo patterns SSP41 to SSP46, and the erase pattern EP4 are illustrated as extending obliquely in a band shape for convenience of description, but actually can be arranged spirally on the disk 10.

In the example illustrated in FIG. 14, the MPU 60 writes the normal spiral servo pattern SSP41 onto the disk 10 at a predetermined spiral speed. After writing the normal spiral servo pattern SSP41, the MPU 60 overwrites the normal spiral servo pattern SSP42 by shifting by a predetermined offset amount in the forward direction with respect to the normal spiral servo pattern SSP41 at a predetermined spiral speed. After overwriting the normal spiral servo pattern SSP42 on the normal spiral servo pattern SSP41, the MPU 60 overwrites the normal spiral servo pattern SSP43 by shifting by a predetermined offset amount in the forward direction with respect to the normal spiral servo pattern SSP42 at a predetermined spiral speed. After overwriting the normal spiral servo pattern SSP43 on the normal spiral servo pattern SSP42, the MPU 60 overwrites the normal spiral servo pattern SSP44 by shifting by a predetermined offset amount in the forward direction with respect to the normal spiral servo pattern SSP43 at a predetermined spiral speed. After overwriting the normal spiral servo pattern SSP44 on the normal spiral servo pattern SSP43, the MPU 60 overwrites the normal spiral servo pattern SSP45 by shifting by a predetermined offset amount in the forward direction with respect to the normal spiral servo pattern SSP44 at a predetermined spiral speed. After overwriting the normal spiral servo pattern SSP45 on the normal spiral servo pattern SSP44, the MPU 60 writes the overwritten spiral servo pattern by overwriting the normal spiral servo pattern SSP46 by shifting by a predetermined offset amount in the forward direction with respect to the normal spiral servo pattern SSP45 at a predetermined spiral speed.

The MPU 60 writes the overwritten erase spiral pattern SSP4 by overwriting the erase pattern EP4 in the center part of the width of the overwritten spiral servo pattern including the normal spiral servo patterns SSP41 to SSP46.

FIG. 15 is a schematic view illustrating an example of a table TB2 of an offset amount of the overwritten erase spiral pattern according to the second embodiment. FIG. 15 illustrates the table TB2 of the offset amount corresponding to the overwritten erase spiral pattern SSP4 illustrated in FIG. 14. The table TB2 includes an overwriting number corresponding to the order of overwriting the spiral servo pattern in the overwritten erase spiral pattern, an offset amount with respect to the spiral servo pattern SSP44 of the overwriting number 4, and the number of times of repetition of each spiral servo pattern SSP. The table TB2 may be recorded in a predetermined record region, for example, the disk 10, the volatile memory 70, the nonvolatile memory 80, or the buffer memory 90.

In the example illustrated in FIG. 15, the MPU 60 writes the spiral servo pattern SSP41 by shifting by +1.5 tracks in the direction opposite to the forward direction (hereinafter, sometimes referred to as reverse forward direction) from the position where the spiral servo pattern SSP44 is arranged. The MPU 60 may repeatedly overwrite the spiral servo pattern SSP41 one to five times.

The MPU 60 overwrites the spiral servo pattern SSP42 in the forward direction of the spiral servo pattern SSP41 by shifting by +1.0 track in the direction opposite to the forward direction (hereinafter, sometimes referred to as reverse forward direction) from the position where the spiral servo pattern SSP44 is arranged. The MPU 60 may repeatedly overwrite the spiral servo pattern SSP42 one to five times.

The MPU 60 overwrites the spiral servo pattern SSP43 in the forward direction of the spiral servo pattern SSP42 by shifting +0.5 tracks in the reverse forward direction from the position where the spiral servo pattern SSP44 is arranged. The MPU 60 may repeatedly overwrite the spiral servo pattern SSP43 one to five times.

The MPU 60 overwrites the spiral servo pattern SSP44 in the forward direction of the spiral servo pattern SSP43. The MPU 60 may repeatedly overwrite the spiral servo pattern SSP44 one to five times.

The MPU 60 overwrites the spiral servo pattern SSP45 in the forward direction of the spiral servo pattern SSP44 by shifting −0.5 tracks in the forward direction from the position where the spiral servo pattern SSP44 is arranged. The MPU 60 may repeatedly overwrite the spiral servo pattern SSP45 one to five times.

The MPU 60 overwrites the spiral servo pattern SSP46 in the forward direction of the spiral servo pattern SSP45 by shifting −1.0 track in the forward direction from the position where the spiral servo pattern SSP44 is arranged, and writes the overwritten spiral servo pattern including the spiral servo patterns SSP41 to SSP46. The MPU 60 may repeatedly overwrite the spiral servo pattern SSP46 one to five times.

The MPU 60 writes the overwritten erase spiral pattern SSP4 by shifting by 0.5 to 0 tracks in the forward direction from the position where the spiral servo pattern SSP44 is arranged and overwriting the erase pattern EP4 in the center part of the width of the overwritten spiral servo pattern including the spiral servo patterns SSP41 to SSP46. The MPU 60 overwrites the erase pattern EP4 only once.

Note that the MPU 60 may repeatedly overwrite six times or more each of the spiral servo patterns SSP41 to SSP46 if writing can be performed without a gap even if the overwriting accuracy is not sufficiently obtained. The MPU 60 may write the overwritten spiral servo pattern by overwriting equal to or less than five spiral servo patterns SSP, or may write the overwritten spiral servo pattern by overwriting equal to or greater than seven spiral servo patterns SSP.

Figure 16:
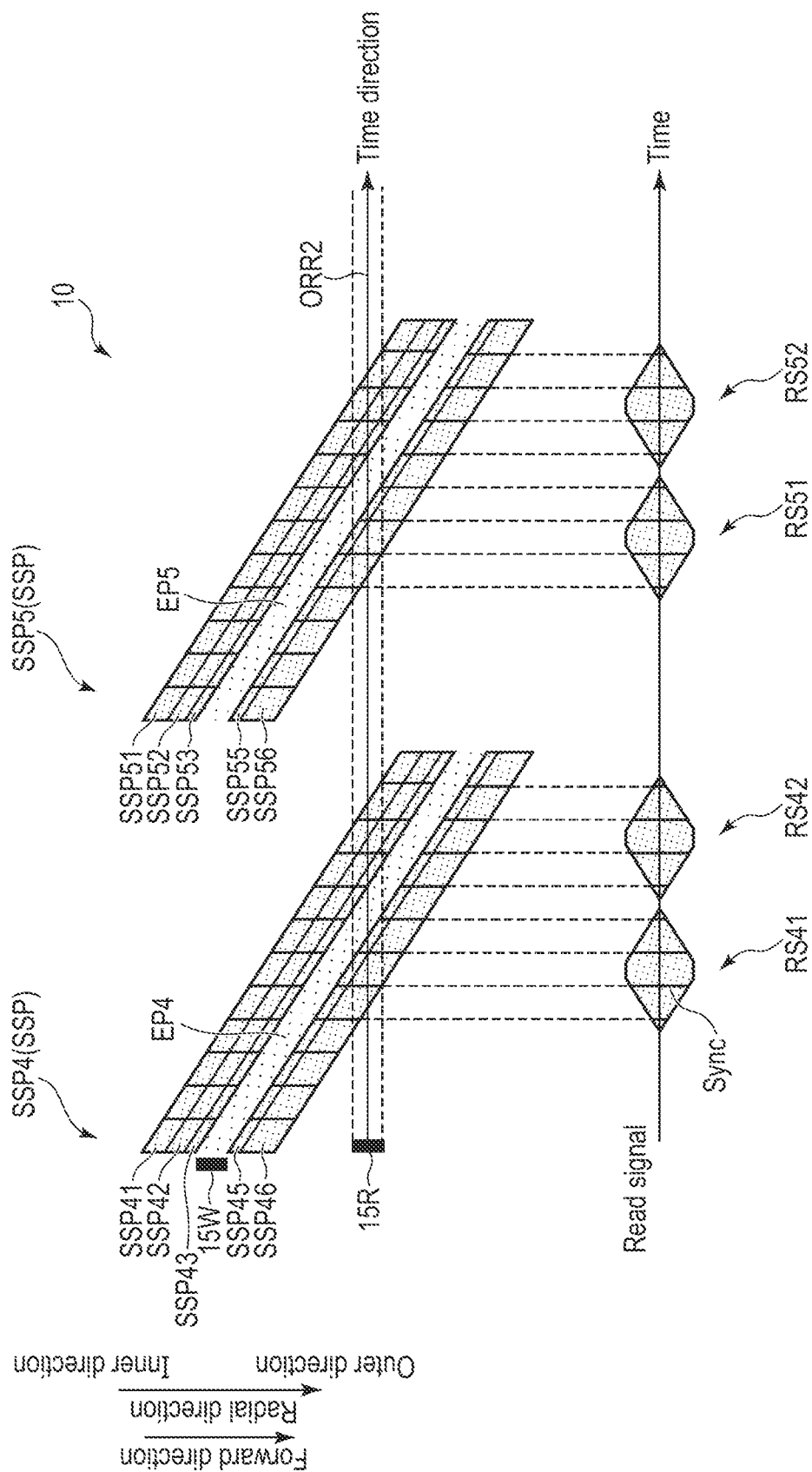
FIG. 16 is a schematic view illustrating an example of a write processing method of the overwritten erase spiral pattern according to the second embodiment.

FIG. 16 is a schematic view illustrating an example of a write processing method of the overwritten erase spiral pattern according to the second embodiment. FIG. 16 illustrates the radial direction, the forward direction, and the time direction. FIG. 16 illustrates overwritten erase spiral patterns SSP4 (SSP) and SSP5 (SSP) continuously arranged on the disk 10 at predetermined intervals. In the overwritten erase spiral patterns SSP4 and SSP5 of FIG. 16, vertical lines correspond to sync marks (Sync). In FIG. 16, the overwritten erase spiral pattern SSP4 includes the spiral servo patterns SSP41, SSP42, SSP43, SSP45, SSP46, and the erase pattern EP4. The overwritten erase spiral pattern SSP5 includes spiral servo patterns SSP51, SSP52, SSP53, SSP55, SSP56, and an erase pattern EP5. In the example illustrated in FIG. 16, the widths of the spiral servo patterns SSP41, SSP42, SSP43, SSP45, SSP46, SSP51, SSP52, SSP53, SSP55, SSP56, the erase patterns EP4, and EP5 correspond to the width of the write head 15W. FIG. 16 illustrates an on-track path ORR2 of the read head 15R with respect to the overwritten erase spiral pattern SSP (SSP4 and SSP5) during on-track. In FIG. 16, the overwritten erase spiral patterns SSP4 (SSP) and SSP5 (SSP) are illustrated as extending obliquely in a band shape for convenience of description, but actually can be arranged spirally on the disk 10. FIG. 16 illustrates read signal strengths RS41, RS42, RS51, and RS52 during on-track. FIG. 16 illustrates time. The read signal strengths RS41 and RS42 during on-track correspond to the magnitudes of signals read by the read head 15R where the overwritten erase spiral pattern SSP4 is put on-track. The read signal strengths RS51 and RS52 during on-track correspond to the magnitudes of signals read by the read head 15R where the overwritten spiral servo pattern SSP5 is put on-track. In the read signal strengths RS41, RS42, RS51, and RS52 during on-track, the vertical line corresponds to the read signal strength at which the sync mark is read.

In the example illustrated in FIG. 16, the MPU 60 writes the overwritten erase spiral pattern SSP4 by overwriting the erase pattern EP4 in the center part of the width of the overwritten spiral servo pattern SSP4 in which the spiral servo patterns SSP41 to SSP46 are overwritten in the forward direction on the disk 10. The MPU 60 writes the overwritten erase spiral pattern SSP5 by overwriting the erase pattern EP5 in the center part of the width of the overwritten spiral servo pattern SSP5 in which the spiral servo patterns SSP51 to SSP56 are overwritten in the forward direction on the disk 10 at intervals in the time direction from the overwritten erase spiral pattern SSP4.

In the example illustrated in FIG. 16, the MPU 60 puts the read head 15R on-track according to the on-track path ORR2, reads the overwritten erase spiral patterns SSP4 and SSP5, and acquires the read signal strengths RS41, RS42, RS51, and RS52 during on-track.

Figure 17:
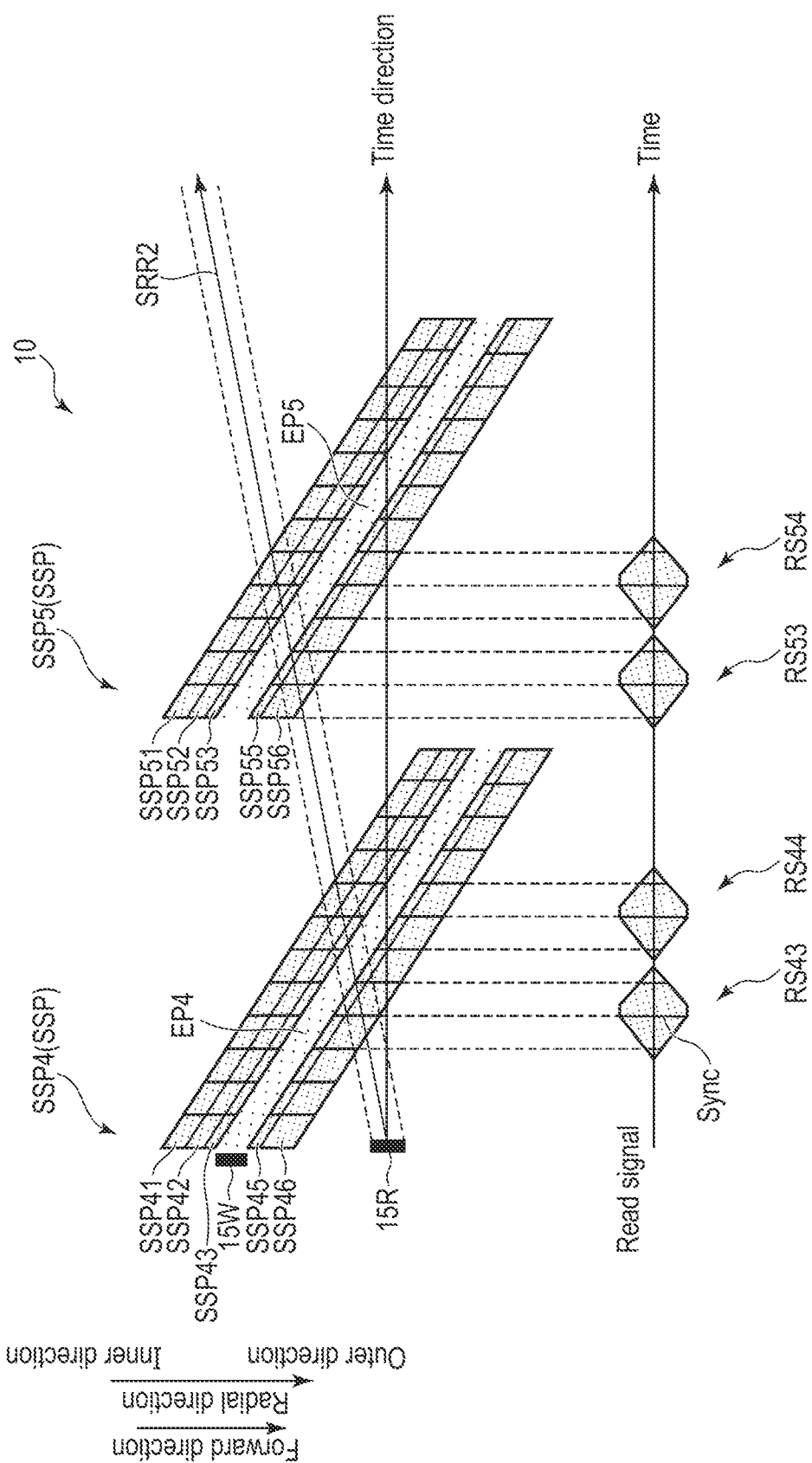
FIG. 17 is a schematic view illustrating an example of the write processing method of the overwritten erase spiral pattern according to the second embodiment.

FIG. 17 is a schematic view illustrating an example of the write processing method of the overwritten erase spiral pattern according to the second embodiment. FIG. 17 illustrates the overwritten erase spiral patterns SSP4 (SSP) and SSP5 (SSP) illustrated in FIG. 16. FIG. 17 illustrates a seek path SRR2 of the read head 15R with respect to the overwritten erase spiral pattern SSP (SSP4 and SSP5) during seek. FIG. 17 illustrates read signal strengths RS43, RS44, RS53, and RS54 during seek. The read signal strengths RS43 and RS44 during seek correspond to the magnitudes of signals read by the read head 15R seeking the overwritten erase spiral pattern SSP4. The read signal strengths RS53 and RS54 during seek correspond to the magnitudes of signals read by the read head 15R seeking the overwritten erase spiral pattern SSP5.

In the example illustrated in FIG. 17, the MPU 60 seeks the read head 15R according to the seek path SRR2, reads the overwritten erase spiral patterns SSP4 and SSP5, and acquires the read signal strengths RS43, RS44, RS53, and RS54 during seek.

Figure 18:
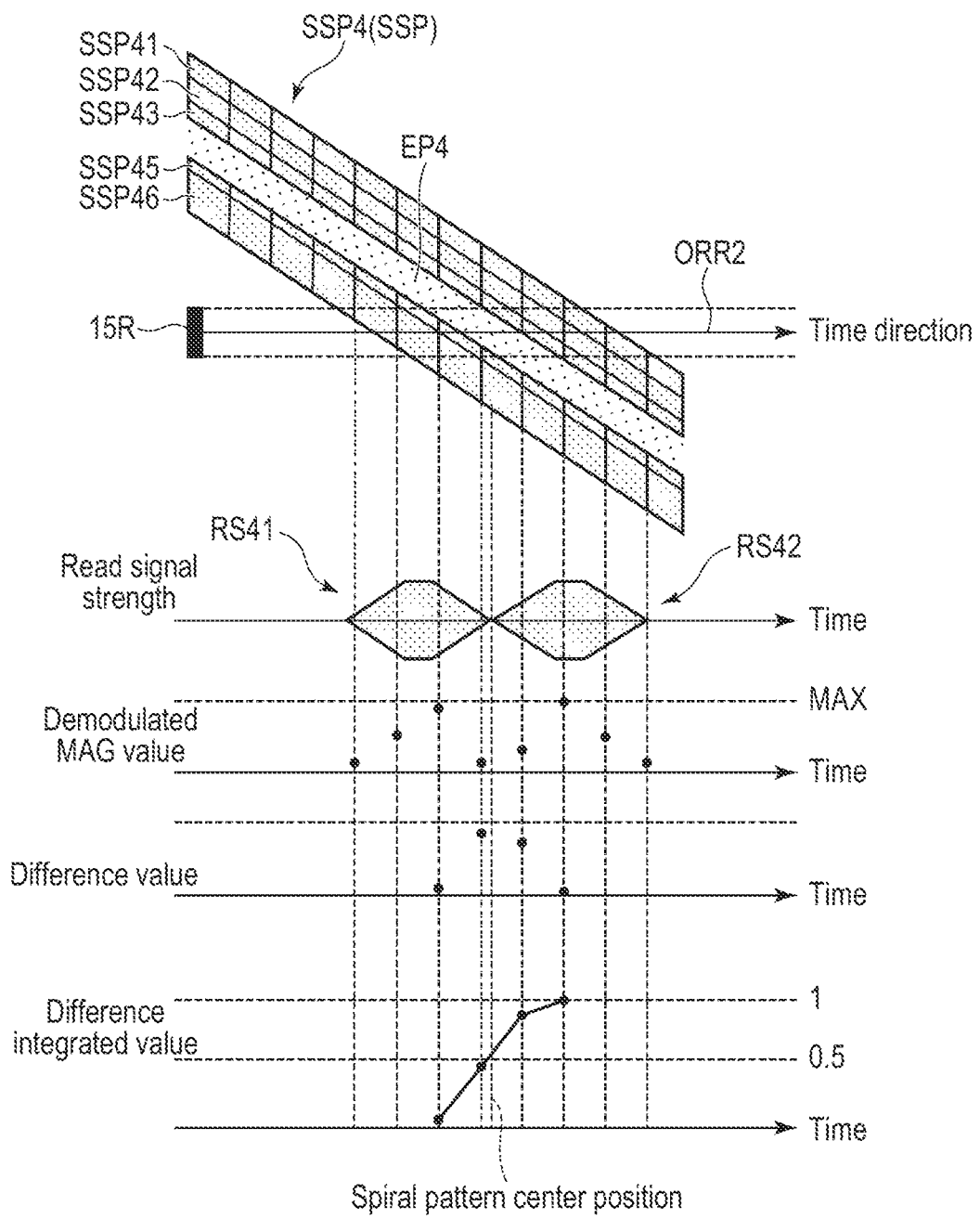
FIG. 18 is a schematic view illustrating an example of a calculation method of an erase pattern center position of the overwritten erase spiral pattern according to the second embodiment.

FIG. 18 is a schematic view illustrating an example of the calculation method of the erase pattern center position of the overwritten erase spiral pattern SSP4 according to the second embodiment. FIG. 18 illustrates the overwritten erase spiral pattern SSP4 illustrated in FIG. 16, the on-track path ORR2, and the read signal strengths RS41 and RS42 during on-track of the overwritten erase spiral pattern SSP4. FIG. 18 illustrates an erase spiral demodulated MAG value corresponding to the read signal strengths RS41 and RS42 during on-track of the overwritten erase spiral pattern SSP4, an erase spiral difference value between the maximum erase spiral demodulated MAG value and the erase demodulated MAG value in this erase spiral demodulated MAG value, and a difference integrated value (hereinafter, sometimes referred to as on-track difference integrated value or a difference integrated value) corresponding to this erase spiral difference value. The horizontal axes of the erase spiral demodulated MAG value, the erase spiral difference value, and the difference integrated value are time.

In the example illustrated in FIG. 18, the MPU 60 acquires each erase spiral demodulated MAG value corresponding to each timing at which the sync mark (Sync) is detected based on the read signal strengths RS41 and RS42 during on-track of the overwritten erase spiral pattern SSP4. The MPU 60 calculates each erase spiral difference value between the maximum erase spiral demodulated MAG value and each erase demodulated MAG value in each erase spiral demodulated MAG value of the overwritten erase spiral pattern SSP4. The MPU 60 calculates a difference integrated value in which these erase spiral difference values are integrated, and calculates the position corresponding to the timing of half (0.5) of this difference integrated value as an erase pattern center position of the overwritten erase spiral pattern SSP4. The MPU 60 may record the erase pattern center position of the overwritten erase spiral pattern SSP4 having been calculated into a predetermined record region, for example, the disk 10, the volatile memory 70, the nonvolatile memory 80, or the buffer memory 90.

Figure 19:
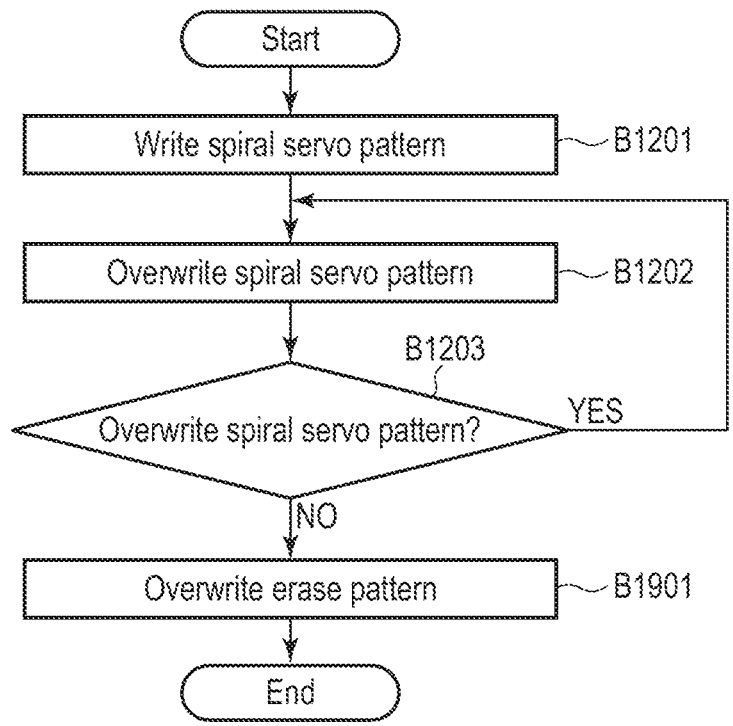
FIG. 19 is a flowchart illustrating an example of a servo pattern write method according to the second embodiment.

FIG. 19 is a flowchart illustrating an example of a servo pattern write method according to the second embodiment.

The MPU 60 writes the predetermined spiral servo pattern (normal spiral servo pattern) SSP on the disk 10 (B1201), shifts a predetermined offset amount in the forward direction, overwrites the other spiral servo pattern (normal spiral servo pattern) SSP on the spiral servo pattern (normal spiral servo pattern) SSP, and thus writes the overwritten spiral servo pattern SSP (B1202). The MPU 60 determines whether to overwrite or not the spiral servo pattern (normal spiral servo pattern) SSP (B1203). If determining to overwrite the spiral servo pattern (normal spiral servo pattern) SSP (YES in B1203), the MPU 60 proceeds to the processing of B1202.

If determining not to overwrite the spiral servo pattern (normal spiral servo pattern) SSP (NO in B1203), the MPU 60 overwrites (B1901) the erase pattern on the center part of the width of the overwritten spiral servo pattern SSP in which the plurality of spiral servo patterns SSP are overwritten, and ends the processing.

Figure 20:
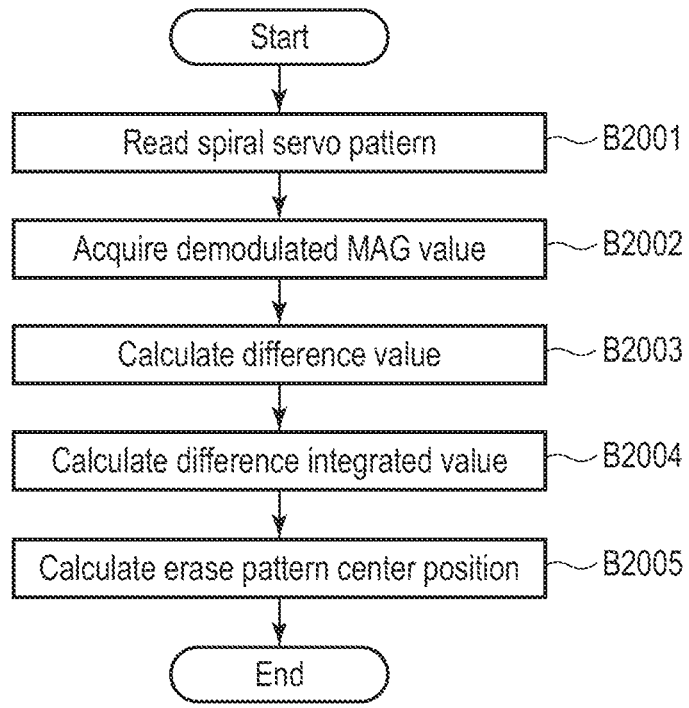
FIG. 20 is a flowchart illustrating an example of the servo pattern write method according to the second embodiment.

FIG. 20 is a flowchart illustrating an example of the servo pattern write method according to the second embodiment.

The MPU 60 reads the spiral servo pattern, for example, the overwritten erase spiral pattern SSP (B2001), and acquires each demodulated MAG value each time the sync mark of the read signal of the overwritten erase spiral pattern SSP is detected (B2002). The MPU 60 calculates each erase spiral difference value between the maximum erase spiral demodulated MAG value and each erase demodulated MAG value in each demodulated MAG value of this overwritten erase spiral pattern SSP (B2003). The MPU 60 calculates the difference integrated value in which the erase spiral difference values are integrated (B2004), calculates the position corresponding to the timing corresponding to half of this difference integrated value as an erase pattern center position (B2005), and ends the processing.

According to the second embodiment, the magnetic disk device 1 writes the overwritten erase spiral pattern SSP by overwriting the erase pattern in the center part of the width of the overwritten spiral servo pattern SSP. The magnetic disk device 1 reads the overwritten erase spiral pattern SSP and acquires each demodulated MAG value each time the sync mark of the read signal of the overwritten erase spiral pattern SSP is detected. The magnetic disk device 1 calculates each erase spiral difference value between the maximum erase spiral demodulated MAG value and each erase demodulated MAG value in each demodulated MAG value of this overwritten erase spiral pattern SSP. The magnetic disk device 1 calculates a difference integrated value in which the erase spiral difference values are integrated, and calculates the position corresponding to the timing corresponding to half of the difference integrated value as an erase pattern center position. The magnetic disk device 1 overwrites the erase pattern by overwriting the plurality of spiral servo patterns SSP without a gap even if unevenness occurs in the width of the spiral servo pattern when the overwriting accuracy is not sufficiently obtained. Therefore, the magnetic disk device 1 can reduce defects and the like in the SSW process even in the head 15 having a narrow write width. Therefore, the magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head that writes data to the disk and reads data from the disk; and
   a controller that controls a position of the head so as to write a first spiral servo pattern to the disk, and overwrite a second spiral servo pattern different from the first spiral servo pattern on the first spiral servo pattern by shifting the second spiral servo pattern by an offset amount in a radial direction of the disk with respect to the first spiral servo pattern and overlapping the second spiral servo pattern on a part of the first spiral servo pattern in the radial direction.

2. The magnetic disk device according to claim 1, wherein the controller executes positioning control of the head based on a Magnitude (MAG) value related to a read signal obtained by reading an overwritten spiral servo pattern in which the second spiral servo pattern is overwritten in the radial direction of the first spiral servo pattern.

3. The magnetic disk device according to claim 2, wherein the controller calculates a position corresponding to timing half of an integrated value obtained by integrating the MAG value as a center position of a width of a first overwritten spiral servo pattern.

4. The magnetic disk device according to claim 3, wherein the controller calculates a position error based on the center position.

5. The magnetic disk device according to claim 1, wherein the controller controls the position of the head so as to write an erase pattern in a center part of a width of an overwritten spiral servo pattern in which the second spiral servo pattern is overwritten in the radial direction of the first spiral servo pattern.

6. The magnetic disk device according to claim 5, wherein a frequency of the erase pattern is greater than frequencies of the first spiral servo pattern and the second spiral servo pattern.

7. The magnetic disk device according to claim 5, wherein the controller controls the position of the head so as to write the erase pattern to the center part only once.

8. The magnetic disk device according to claim 5, wherein the controller executes positioning control of the head based on an MAG value related to a read signal obtained by reading an overwritten erase spiral pattern obtained by writing the erase pattern in a center part of a width of the overwritten spiral servo pattern.

9. The magnetic disk device according to claim 8, wherein the controller calculates a difference value between a maximum value in the MAG value corresponding to the overwritten erase spiral pattern not including the erase pattern and the MAG value corresponding to the overwritten erase spiral pattern including the erase pattern, and calculates a position corresponding to timing half of an integrated value obtained by integrating the difference value as a center position of a width of the overwritten erase spiral pattern.

10. The magnetic disk device according to claim 9, wherein the controller calculates a position error based on the center position.

11. A servo pattern write method applied to a magnetic disk device including a disk and a head that writes data to the disk and reads data from the disk, the servo pattern write method comprising:
   controlling a position of the head so as to write a first spiral servo pattern to the disk, and overwrite a second spiral servo pattern different from the first spiral servo pattern on the first spiral servo pattern by shifting the second spiral servo pattern by an offset amount in a radial direction of the disk with respect to the first spiral servo pattern and overlapping the second spiral servo pattern on a part of the first spiral servo pattern in the radial direction.

12. The servo pattern write method according to claim 11, wherein the controlling comprises executing positioning control of the head based on a Magnitude (MAG) value related to a read signal obtained by reading an overwritten spiral servo pattern in which the second spiral servo pattern is overwritten in the radial direction of the first spiral servo pattern.

13. The servo pattern write method according to claim 12, wherein the controlling comprises calculating a position corresponding to timing half of an integrated value obtained by integrating the MAG value as a center position of a width of a first overwritten spiral servo pattern.

14. The servo pattern write method according to claim 13, wherein the controlling comprises calculating a position error based on the center position.

15. The servo pattern write method according to claim 11, wherein the controlling comprises controlling the position of the head so as to write an erase pattern in a center part of a width of an overwritten spiral servo pattern in which the second spiral servo pattern is overwritten in the radial direction of the first spiral servo pattern.

16. The servo pattern write method according to claim 15, wherein a frequency of the erase pattern is greater than frequencies of the first spiral servo pattern and the second spiral servo pattern.

17. The servo pattern write method according to claim 15, wherein the controlling comprises controlling the position of the head so as to write the erase pattern to the center part only once.

18. The servo pattern write method according to claim 15, wherein the controlling comprises executing positioning control of the head based on an MAG value related to a read signal obtained by writing an overwritten erase spiral pattern obtained by writing the erase pattern in a center part of a width of the overwritten spiral servo pattern.

19. The servo pattern write method according to claim 18, wherein the controlling comprises calculating a difference value between a maximum value in the MAG value corresponding to the overwritten erase spiral pattern not including the erase pattern and the MAG value corresponding to the overwritten erase spiral pattern including the erase pattern, and calculating a position corresponding to timing half of an integrated value obtained by integrating the difference value as a center position of a width of the overwritten erase spiral pattern.

20. The servo pattern write method according to claim 19, wherein the controlling comprises calculating a position error based on the center position.

* * * * *